United States Patent
Karnik et al.

(10) Patent No.: US 8,652,332 B2
(45) Date of Patent: Feb. 18, 2014

(54) LIQUID FILTRATION USING PRESSURE DIFFERENCE ACROSS A HYDROPHOBIC MEMBRANE

(75) Inventors: Rohit N. Karnik, Cambridge, MA (US); Jongho Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 736 days.

(21) Appl. No.: 12/685,315

(22) Filed: Jan. 11, 2010

(65) Prior Publication Data

US 2010/0176057 A1 Jul. 15, 2010

Related U.S. Application Data

(60) Provisional application No. 61/143,521, filed on Jan. 9, 2009.

(51) Int. Cl.
*B01D 39/00* (2006.01)
*B01D 53/22* (2006.01)

(52) U.S. Cl.
USPC .............................................. 210/640; 95/52

(58) Field of Classification Search
USPC ................ 210/651, 640, 500.27, 416.2, 483; 95/52
See application file for complete search history.

(56) References Cited

U.S. PATENT DOCUMENTS

| | | | | |
|---|---|---|---|---|
| 4,187,390 A * | 2/1980 | Gore | ........................ | 174/102 R |
| 4,419,242 A | 12/1983 | Cheng et al. | | |
| 4,476,024 A * | 10/1984 | Cheng | ............................ | 203/39 |
| 4,879,041 A * | 11/1989 | Kurokawa et al. | ............ | 210/640 |
| 5,028,298 A * | 7/1991 | Baba et al. | ....................... | 159/31 |
| 5,037,554 A * | 8/1991 | Nomi | ................................ | 95/52 |
| 5,066,403 A * | 11/1991 | Dutta et al. | .................... | 210/638 |
| 5,098,566 A | 3/1992 | Lefebvre | | |
| 5,100,544 A * | 3/1992 | Izutani et al. | ................. | 210/175 |
| 5,102,550 A * | 4/1992 | Pizzino et al. | ................ | 210/640 |
| 5,232,085 A * | 8/1993 | Hayashi et al. | ................ | 202/182 |
| 5,437,796 A * | 8/1995 | Bruschke et al. | ............. | 210/640 |
| 5,798,119 A | 8/1998 | Herbig et al. | | |
| 5,827,538 A | 10/1998 | Cussler et al. | | |
| 6,517,725 B2 * | 2/2003 | Spearman et al. | ............ | 210/640 |
| 7,361,276 B2 | 4/2008 | Twardowski et al. | | |
| 7,442,303 B2 * | 10/2008 | Jacobson | .................... | 210/510.1 |
| 7,488,421 B2 | 2/2009 | Hambitzer et al. | | |

(Continued)

OTHER PUBLICATIONS

Miller, J. E. Review of Water Resources and Desalination Technologies; Sandia National Laboratories: 2003; pp. 1-54.

(Continued)

*Primary Examiner* — Ana Fortuna
(74) *Attorney, Agent, or Firm* — Thomas J. Engellenner; Reza Mollaaghababa; Pepper Hamilton LLP

(57) ABSTRACT

Method and devices for filtering liquid are provided that rely on pressure difference to filter liquid. In one embodiment, a device for filtering liquid includes a feed chamber, a permeate chamber, and a porous membrane that is at least partially hydrophobic and has one or more pores configured to be permeable to vapor. A pressure of a liquid substance in the feed chamber is increased such that vapor of the liquid substance is transported from the feed chamber to the permeate chamber. The resistance of flow in a hydrophilic layer of the membrane can be controlled to make the membrane defect-tolerant. In another embodiment, a second porous membrane is further included and the second porous membrane is spaced apart from the first porous membrane. Various methods for filtering liquid are also provided.

12 Claims, 10 Drawing Sheets

(56) References Cited

U.S. PATENT DOCUMENTS

| | | | |
|---|---|---|---|
| 7,638,059 B2* | 12/2009 | Kim et al. | 210/651 |
| 8,287,735 B2* | 10/2012 | Hanemaaijer et al. | 210/640 |
| 2004/0217047 A1 | 11/2004 | Bomberger et al. | |
| 2005/0145107 A1 | 7/2005 | Kessler et al. | |
| 2005/0167354 A1 | 8/2005 | Caze et al. | |
| 2006/0144788 A1 | 7/2006 | Cath et al. | |
| 2008/0173539 A1 | 7/2008 | Twardowski et al. | |
| 2008/0197077 A1 | 8/2008 | Swartley et al. | |
| 2008/0223795 A1 | 9/2008 | Bakajin et al. | |
| 2008/0237126 A1 | 10/2008 | Hoek et al. | |
| 2009/0117631 A1* | 5/2009 | Cote et al. | 435/161 |
| 2010/0072135 A1* | 3/2010 | Hanemaaijer et al. | 210/640 |
| 2010/0176057 A1* | 7/2010 | Karnik et al. | 210/640 |
| 2011/0198287 A1* | 8/2011 | Dukes et al. | 210/640 |

OTHER PUBLICATIONS

Richard P. Cincotta, R. E., Daniele Anastasion The Security Demographic: Population and Civil Conflict After the Cold War; Population Action International: Washington D.C., 2003; pp. 11-86.

Robert Engelman, R. P. C., Bonnie Dye, Tom Gardner-Outlaw, Jennifer Wisnewski People in the Balance: Population and Natural Resources at the Turn of the Millennium; Population Action International: Washington D.C., 2000; pp. 1-36.

Mark A. Shannon, P. W. B., Menachem Elimelech, John G. Georgiadis, Benito J. Marinas, Anne M. Mayes, Science and technology for water purification in the coming decades. Nature 2008, 452, 301-310.

Byeong-Heon Jeong, E. M. V. H., Yushan Yan, Arun Subramani, Xiaofei Huang, Gil Hurwitz, Asim K. Ghosh, Anna Jawor, Interfacial Polymerization of Thin Film Nanocomposites: A New Concept for Reverse Osmosis Membrane. Journal of Membrane Science 2007, 294, (1-2), 1-7.

Meindersma, C. M.Guijit, A.B. de Haan, Water Recycling and Desalination by Air Gap Membrane Distillation, Environmental Progress (vol. 24, No. 4), Dec. 2005, pp. 434- 441.

S. J. Gregg, K. S. W. S., Adsorption, Surface Area and Porosity. Academic Press: London and New York, 1967, pp. 123-128.

Carter, A. H., Classical and Statistical Thermodynamics. Prentice Hall: New Jersey, 2001, pp. 198-199.

U. Razdan, S. V. J., V. J. Shah, Novel Membrane Processes for Separation of Organics. Current Science 2003, 85, (6), 761-771.

R. L. Riley, H. I. L., C. R. Lyons, Composite Membranes for Seawater Desalination by Reverse Osmosis. Journal of Applied Polymer Science 1971, 15, 1267-1276.

Williams, M. E. A Brief Review of Reverse Osmosis Membrane Technology; EET Corporation and Williams Engineering Services Company: Albany, 2003; pp. 1-29.

Kevin W. Lawson, D. R. L., Membrane Distillation II. Direct Contact MD. Journal of Membrane Science 1996, 120, 123-133.

Surapit Srisurichan, R. J., A.G. Fane, Mass Transfer Mechanisms and Transport Resistances in Direct Contact Membrane Distillation Process. Journal of Membrane Science 2006, 277, 186-194.

Mohammad Soltanieh, W. N. G., Review of Reverse-Osmosis Membranes and Transport Models. Chemical Engineering Communications 1981, 12, (4-6), 279-363.

E. A. Mason, A. P. M., Gas transport in porous media: the dusty-gas model. Elsevier: New York, 1983, pp. 30-50.

Kevin W. Lawson, D.R.L., Membrane distillation. Journal of Membrane Science 1997, 123, 1-25.

Thomas K. Sherwood, R.L.P., Charles R. Wilke, Mass transfer. McGraw-Hill: 1975, pp. 16-24.

Hare, E.F.; Shafrin, E.G.; Zisman, W.A., Properties of Films of Adsorbed Fluorinated Acids. Journal of Physical Chemistry 1954, 58 (3), 236-239.

L. Gazagnes, S. Cerneaux, M. Persin, E. Prouzet, and A. Larbot "Desalination of sodium chloride solutions and seawater with hydrophobic ceramic membranes"; Desalination, Published by Elsevier B.C., vol. 217, Issues 1-3, Nov. 5, 2007, pp. 260-266.

International Preliminary Report on Patentability for PCT/US2010/020625, dated Jul. 21, 2011. (6 pages).

International Search Report and Written Opinion for PCT/US2010/020625, dated Aug. 23, 2010. (9 pages).

\* cited by examiner

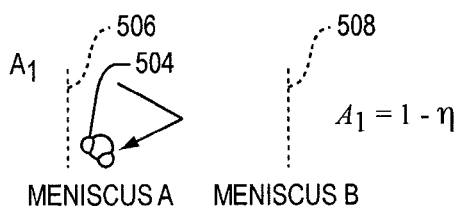
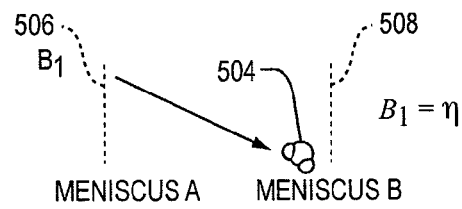
FIG. 4A  FIG. 4B
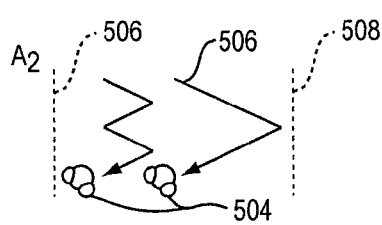
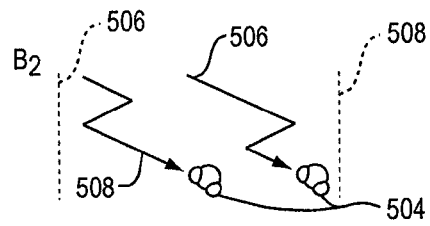
$A_2 = A_1(1-\sigma)(1-\eta) + B_1(1-\sigma)\eta$
FIG. 4C
$B_2 = A_1(1-\sigma)\eta + B_1(1-\sigma)(1-\eta)$
FIG. 4D
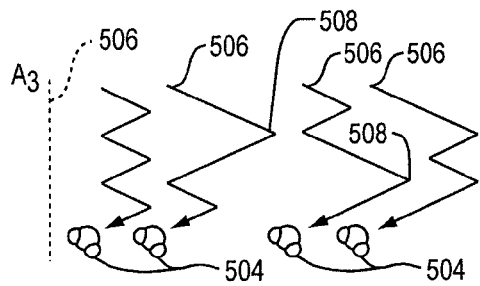
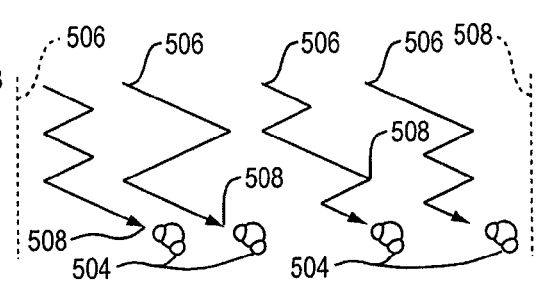
$A_3 = A_2(1-\sigma)(1-\eta) + B_2(1-\sigma)\eta$
$\vdots$
$A_{n+1} = A_n(1-\sigma)(1-\eta) + B_n(1-\sigma)\eta$
FIG. 4E
$B_3 = A_2(1-\sigma)\eta + B_2(1-\sigma)(1-\eta)$
$\vdots$
$B_{n+1} = A_n(1-\sigma)\eta + B_n(1-\sigma)(1-\eta)$
FIG. 4F

LIQUID FILTRATION USING PRESSURE DIFFERENCE ACROSS A HYDROPHOBIC MEMBRANE

PRIORITY

The present invention claims priority to U.S. Provisional Application No. 61/143,521, "Liquid Filtration Using Pressure Difference Across a Hydrophobic Membrane" and filed on Jan. 9, 2009.

FIELD

The present invention generally relates to devices and processes for filtering a liquid substance and more specifically relates to using a pressure difference to induce vapor phase transport of the substance across one or more hydrophobic membranes to filter the liquid.

BACKGROUND

Although water is one of the most abundant resources in nature, the availability of fresh water is a problem in many regions of the world. Increasing demand and changing climate may worsen the fresh water availability problem. In developing countries, many diseases and deaths are attributed to the poor quality of water. The scarcity of fresh water is expected to become more serious in those countries, and also in the Middle East and North African countries that are suffering from lack of renewable fresh water. The number of people who will face water shortage in the year 2025 is estimated about four times larger than the number of those in the year 2000. This water shortage problem has necessitated a variety of desalination technologies and methods for brackish water and sea water. Some of the representative approaches are thermal distillation and membrane techniques such as multi-stage flash distillation and reverse osmosis. While these methods have been used and improved upon for a number of years, they still have many deficiencies that can be improved. These deficiencies include the relatively high energy requirements, high cost, fouling issues, pre-treatment requirements, and the low flux which many of the current, membrane-based devices and methods experience.

Multi-stage flash distillation is the representative thermal approach for desalination and is utilized mainly in Middle East countries. This method basically comprises a series of evaporation and condensation steps. The feed salt water is heated by steam and then a portion of the heated feed water is vaporized by being exposed to a lower pressure stage. The remaining water is introduced to the next stage where pressure that is lower than pressure in the previous stage is applied to the water. The process continues until sufficient water is processed to recover distilled water by condensation. To increase the thermal efficiency, it is common that the condensation occurs on the contact to pipes transporting cold feed water, and this condensation process has a role of pre-heating for the feed water. The main disadvantage of this approach, however, comes from the high energy requirement due to the high latent heat of water, which can be approximately 290 kJ/kg to desalinate sea water in some instances.

While membrane-based reverse osmosis is more economical than the thermal processes with respect to the cost of energy, it too involves its own challenges. For instance, a large fraction of the cost for desalination arises from membranes and their maintenance. Further, although increasing the membrane flux may decrease the required membrane area and capital costs, it requires large pressures that lead to viscous losses and decreased efficiency. The cost of producing current membrane-based reverse osmosis systems increases as the concentration of the solute increases. Still further, reverse osmosis membranes suffer from fouling, scaling, viscous losses, having weak resistance to chlorine, having insufficient boron rejection, and having low mass flux per unit area of the membrane, which in turns requires large membrane areas. Further improvement in reverse osmosis hinges on improvement in flux and fouling resistance, which is determined primarily by membrane structure and composition.

Hybrid distillation methods such as direct contact membrane distillation, which uses a hydrophobic membrane in between salt water and purified water, rely on temperature differences to evaporate and condense water. Direct contact membrane distillation is highly inefficient as there is a huge heat loss across the membrane by conduction, and other distillation approaches have to deal with heat transport from the condensate to the evaporating salt water. Other variations of membrane distillation, such as air-gap membrane distillation and vacuum-enhanced membrane distillation, also suffer from similar drawbacks.

Accordingly, there is a need for liquid filtration methods, particularly for desalinating water and purifying water, that are energy efficient, avoid fouling and viscous losses, support high flux, and do not rely on temperature differences in order to filter the liquid.

SUMMARY OF THE INVENTION

Methods and devices for filtering liquid, for example desalinating or purifying water, are provided that rely on pressure difference to filter water. In particular, the pressure difference produces a difference in vapor pressure across a hydrophobic membrane to filter the liquid as desired. In one embodiment, a device for filtering liquid includes a feed chamber, a permeate chamber, a porous membrane that is at least partially hydrophobic with one or more pores that are configured to be permeable to vapor, and a pressure-inducing component that is configured to apply a pressure to a liquid disposed in the feed chamber. The porous membrane is disposed between the feed chamber and the permeate chamber and the pressure applied by the pressure-inducing component is sufficient to transport vapor from the feed chamber to the permeate chamber, i.e. equal to or greater than the osmotic pressure difference between the feed side and permeate side. The porous membrane can also be partially hydrophilic. For example, the porous membrane can be partially hydrophilic and include a coating that is hydrophobic. In one embodiment, one or more pores can be approximately cylindrical and can include a hydrophobic portion and a hydrophilic portion. One or more pores can be configured to control a resistance of the hydrophilic portion of the one or more pores. In one embodiment, at least one of a diameter of the pore and a length of the pore can be adjusted to control the resistance of the hydrophilic portion. Alternatively, the device can include end caps disposed on ends of one or more pores to control a resistance of the hydrophilic portion of the one or more pores. In another embodiment, a permeable material can be disposed in at least a portion of the hydrophilic portion of one or more pores to control a resistance of the hydrophilic portion of the one or more pores. The device can also include a protective, ultrafiltration layer having high permeability to water. The layer can be located on a side of the porous membrane that includes the feed chamber. In another embodiment, the device can include an anti-fouling layer coupled to a side of the porous membrane adjacent to the feed chamber.

The porous membrane can also have many different porosities, for example approximately in the range of about 30 percent to about 80 percent, or approximately in the range of about 50 percent to about 70 percent. The device can be approximately isothermal. In one embodiment, the device is operable at temperatures of approximately 95 degrees Celsius or less. In a further embodiment, the porous membrane can have a defect-tolerant design. For example, one or more pores of the porous membrane can be at least partially hydrophobic and partially hydrophilic. The fluidic resistance of the hydrophilic portion of the pores can be adjusted in order to make the membrane more tolerant to defects.

The device can also include a second porous membrane that is at least partially hydrophobic with one or more pores that are configured to be permeable to vapor. The second porous membrane can also be disposed between the feed chamber and the permeate chamber, and the first and second porous membranes can be spaced apart such that vapor passing from the feed chamber to the permeate chamber can do so with less flow resistance. A diameter of one or more pores of the second porous membrane can be larger than a diameter of one or more pores of the first porous membrane. For example, at least one of the diameters of the one or more pores of the first porous membrane can be approximately 20 nanometers or less and at least one of the diameters of the one or more pores of the second porous membrane can be approximately in the range of greater than about 20 nanometers to about 200 nanometers. In one embodiment, a distance between the first and second membranes is larger than at least one of the diameters of the one or more pores of the second porous membrane. For example, the diameter of at least one of the pores of the second porous membrane can be approximately 200 nanometers or less and the distance between the first and second membranes can be approximately in the range of greater than about 200 nanometers to about 1 micrometer. A device that includes at least two porous membranes spaced apart from each other can also include at least one spacer disposed between the two membranes. Additionally, sides of the first and second porous membranes that face each other can include a coating that is hydrophobic.

One exemplary embodiment of a method for filtering a liquid substance includes providing a filtration device having a feed chamber, a permeate chamber, and a porous membrane that is at least partially hydrophobic disposed between the feed chamber and the permeate chamber and applying a pressure to liquid substance disposed in the feed chamber to cause the substance to pass as a vapor from the feed chamber to the permeate chamber. In one embodiment a liquid can be disposed in the feed chamber and a liquid having a solute can be disposed in the permeate chamber. A pressure can then be applied to the liquid disposed in the feed chamber to cause the substance to pass as a vapor from the feed chamber to the permeate chamber. Alternatively, the liquid in the feed chamber can be allowed to pass as a vapor to the permeate chamber under the influence of osmotic pressure difference that is introduced by the solute on the permeate side.

The provided filtration device can further include a second porous membrane that is at least partially hydrophobic and is disposed between the feed chamber and the permeate chamber. In such an instance, the method can include providing a gap disposed between the first and second porous membranes across which the vapor passes as it traverses from the feed chamber to the permeate chamber. The method can further include degassing the gap, which may also be achieved by degassing the feed water before introducing into the device. The pressure applied to the liquid substance generally can be approximately greater than osmotic pressure. In one embodiment, the pressure applied to the liquid substance is approximately at least 30 atmospheres, which is approximately the osmotic pressure of sea water. In another embodiment, the pressure applied to the liquid substance is approximately at least 50 atmospheres. The method can be isothermal (e.g., less than about a 50 degree Celsius temperature difference between the feed side and the permeate side of the membrane). In another embodiment, in which there is no device generating heat, a temperature difference across a membrane induced by latent heat transport and conduction through the membrane can be in the range of about 0.005 degrees Celsius to about 0.02 degrees Celsius, and more particularly on the order of about 0.01 degrees Celsius. The method can further include rinsing and drying the porous membrane to restore wetted pores to a non-wetted state.

In another embodiment of a method for filtering a liquid substance includes providing a porous membrane disposed between a feed side and a permeate side, providing a liquid substance on the feed side, forming a first liquid meniscus at one side of a pore of the porous membrane, forming a second liquid meniscus at another side of the pore of the porous membrane, and transporting the substance as a vapor between the first and second menisci. The method can further include increasing a curvature of one or both of the first and second menisci. The method can also be approximately isothermal. In one embodiment, the method further includes providing a second porous membrane disposed between the feed side and the permeate side, providing a gap between the feed side and the permeate side such that the first porous membrane is disposed on one side of the gap, adjacent to the feed side, and the second porous membrane is disposed on another side of the gap, adjacent to the permeate side. In such an embodiment, the first liquid meniscus is formed at a pore of the first porous membrane adjacent to the gap and the second liquid meniscus is formed at a pore of the second porous membrane adjacent to the gap. The method can further include degassing the gap.

BRIEF DESCRIPTION OF DRAWINGS

This invention will be more fully understood from the following detailed description taken in conjunction with the accompanying drawings, in which:

FIG. 4A is a schematic drawing of one possible path option for a molecule in a pore in accordance with the present invention in which the molecule is emitted from a first meniscus and arrives at the first meniscus;

FIG. 4B is a schematic drawing of another possible path option for a molecule in a pore in accordance with the present invention in which the molecule is emitted from a first meniscus and arrives at a second meniscus;

FIG. 4C is a schematic drawing of two other possible path options for a molecule in a pore in accordance with the present invention in which the molecule is emitted from a first meniscus and arrives at the first meniscus following one or more deflections;

FIG. 4D is a schematic drawing of yet two other possible path options for a molecule in a pore in accordance with the present invention in which the molecule is emitted from a first meniscus and arrives at a second meniscus following one or more deflections;

FIG. 4E is a schematic drawing of still four other possible path options for a molecule in a pore in accordance with the present invention in which the molecule is emitted from a first meniscus and arrives at the first meniscus following one or more deflections;

FIG. 4F is a schematic drawing of four other possible path options for a molecule in a pore in accordance with the present invention in which the molecule is emitted from a first meniscus and arrives at a second meniscus following one or more deflections;

DETAILED DESCRIPTION

Figure 1:
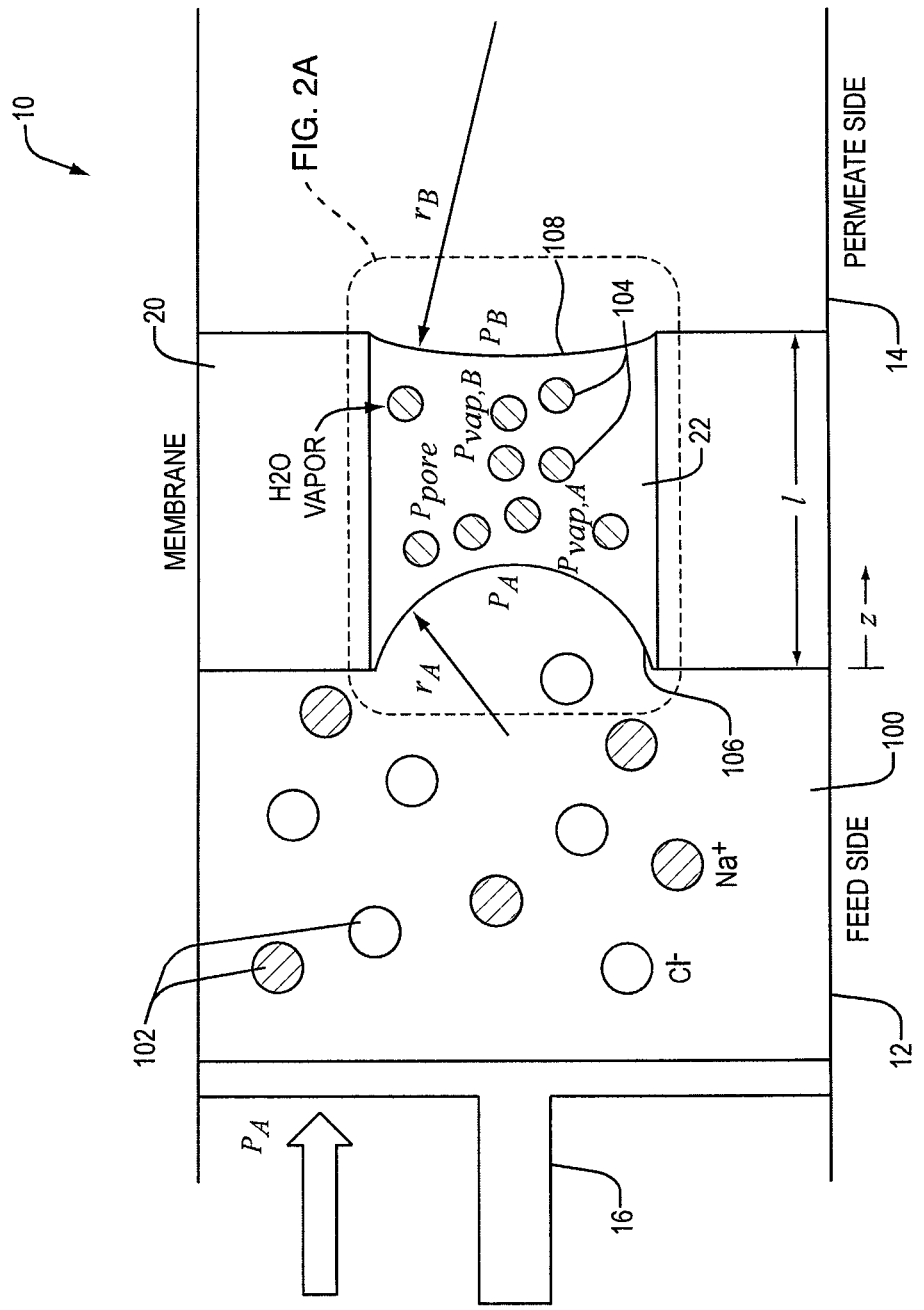
FIG. 1 is a schematic view of one embodiment of a device for filtering a liquid substance.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Devices and methods are generally provided that rely on pressure differences to filter a liquid. In fact, no temperature difference is required across the water-water vapor interfaces that can be used in the devices and methods disclosed herein. As a result, thermal losses can be significantly decreased, which in turn results in more energy efficient devices and methods. The present devices and methods improve upon energy efficiency when compared to other devices and methods that perform similar functions while retaining the ability to support high flux due to low transport resistance. More particularly, the devices and methods use pressure difference to produce a difference in the vapor pressure across a hydrophobic porous membrane. A large pressure is applied to the liquid to be filtered, which in turn transports the liquid, in vapor form, to a second location, on the other side of the hydrophobic porous membrane, where the vapor can return to its liquid state in a filtered form. The hydrophobic porous membrane, and more particularly the pores of the membrane, serve as a vapor-phase transport mechanism because of the large pressure applied to the unfiltered liquid.

Although the inventions discussed herein will generally be discussed as being used with water, a person having ordinary skill in the art would recognize that a variety of different liquids, either alone or in combination, could be used in conjunction with the disclosed devices and methods. Use of the word water in no way is intended to limit use of the devices and methods to use only with water. Further, words such as filtering, desalinating, and purifying may be used throughout the application interchangeably, and as such, to the extent one of these words is used in a statement, such a statement is generally applicable to all three of these words, as well as other related synonyms. Still further, in some instances the devices and methods refer to chambers and sides. To the extent that the words are used interchangeably, they do not necessarily have the same meaning. A side generally refers to a location while a chamber generally refers to a structure. Nevertheless, to the extent descriptions are discussed with respect to a chamber, in other embodiments no such structure may be needed. Likewise, to the extent descriptions are discussed with respect to a side, in other embodiments the side can include a structure such as a chamber.

One exemplary embodiment of a device 10 for filtering is illustrated in FIG. 1 and includes a feed chamber 12, a permeate chamber 14, and a porous membrane 20 disposed therebetween. The porous membrane 20 is at least partially hydrophobic and it is configured to be permeable to vapor. The device 10 can further include one or more pressure-inducing components configured to apply a pressure to water 100 disposed in the feed chamber 12. In the illustrated embodiment, the pressure-inducing component is a piston 16, although any number of components capable of inducing a pressure on a liquid can be used, including, by way of non-limiting examples, a pump, electric charges, or one or more magnetic devices. As shown, the water 100 located in the feed chamber 12 includes one or more particles 102 disposed therein, such as salt. As pressure is applied to the water 100 by way of the piston 16, the water 100 is transported through the porous membrane 20 in vapor form, illustrated as vapor particles 104, via pores 22 of the membrane 20, and ends in the permeate chamber 14. The particles 102, such as salt, are non-volatile and are therefore incapable of passing through the porous membrane 20 in vapor phase, and thus the water 100 located in the permeate chamber 14 is filtered so as not to include the particles 102 it contained when located in the feed chamber 12.

The feed chamber 12 and permeate chamber 14 can be formed from a variety of different materials and can have any number of shapes and dimensions. The shapes and dimensions of the feed and permeate chambers 12, 14 are likely to be a function of the desired use, among other factors. For example, use of the device 10 to filter a liter of sea water can result in a smaller feed and permeate chamber than use of the device 10 to filter a tanker-full of sea water. The types of materials that can be used to form the feed and permeate chambers 12, 14 is virtually limitless, and includes, by way of non-limiting example, any polymer.

The membrane 20 is porous and is at least partially hydrophobic. While it can be completely hydrophobic, in one exemplary embodiment it is made from both hydrophilic and hydrophobic materials. Such a combination can be achieved in a variety of ways, for example by manufacturing layers of each material and mating them together as desired, or alternatively, by coating the membrane 20 with a hydrophobic material. In one embodiment, a side of the membrane 20 adjacent to the feed chamber 12 is coated with a hydrophobic material. In another embodiment, both a side of the membrane 20 adjacent to the feed chamber 12 and a side adjacent to the permeate chamber 14 are coated with a hydrophobic material. A variety of hydrophobic and hydrophilic materials can be used to form the membrane 20. For example, most any fluorocarbon-based polymer can be used as a hydrophobic material, such as polytetrafluoroethylene (PTFE), and most any polymeric, ceramic, or other material can be used as a hydrophilic material, such as an alumina substrate. In one embodiment, the membrane 20 includes an alumina substrate as a hydrophilic material because it can allow for pore size to be easily controlled and then the alumina substrate is coated with PTFE to provide the necessary hydrophobic properties of the device 10. In coating a hydrophilic material, the surface of the hydrophilic material can also be modified as needed.

Pores 22 in the membrane 20 can likewise be formed in a variety of ways. In some instances the pores 22 may already be part of the materials used to form the membrane 20. In other instances pores 22 may need to be created mechanically, electrochemically, or by using other methods generally known for creating pores. In one embodiment, multiple membranes are spaced apart to form pores therebetween. While any number of pores can be formed in the membrane 20, in one embodiment the porosity, which is defined by the ratio of the area of the pores compared to the area of the membrane, is approximately in the range of about 30 percent to about 80 percent, and more preferably in the range of about 50 percent to about 70 percent. The porosity of the membrane 20 will likely be determined based on the desired use and output of the device and/or method.

The pore 22 is generally sufficiently small to withstand an applied pressure by the pressure-inducing component. Generally, the average radius of the pores 22 (illustrated in FIG. 1 as "a" because the diameter is "2a") can be approximately in the range of about 1 nanometer to about 1 micrometer. One skilled in the art will appreciate that the radius a and the diameter 2a of the pore can be used interchangeably by adjusting the relevant mathematical equations to account for whether the radius or the diameter is used. Two of the many factors that will likely affect the desired pore diameter are the type of liquid being filtered and the amount of pressure that will be applied to the liquid substance. For example, if the liquid is sea water, a pore diameter approximately in the range of about 5 nanometers to about 30 nanometers is preferred. In one embodiment the average diameter of the pores 22 can be approximately 10 nanometers for sea water having a nominal molar concentration of about 0.62 M. For brackish water, larger pores can be more desirable, such as approximately 200 nanometers. Generally, as the amount of materials disposed in the liquid substance to be filtered decreases, the size of the pores increases. Further, in accordance with the principles of Knudsen, the smaller a pore is, the larger resistance it provides. Smaller pores can be more difficult to manufacture though.

The pores can be configured to have both hydrophilic properties and hydrophobic properties. Accordingly, the pores can include a hydrophilic portion and a hydrophobic portion. The pores can be configured to control a resistance of the hydrophilic portion in a number of different manners, as elaborated upon further below. For example, one or more of the pores can be configured to have a diameter of the pore adjusted, a length of the pore adjusted, or both adjusted. Alternatively, ends of one or more pores can be covered, for instance with a permeable material. Another way to control a resistance of the hydrophilic portion is to dispose a permeable material either partially or fully into the hydrophilic portion of the pore. The permeable material covering the ends or disposed in the hydrophilic portion can, preferably, be thin. Two examples of materials for use with the pores are polymers and ceramics.

It can be desirable to include one or more permeable layers on a feed side of the membrane. For example, a protective, ultrafiltration layer having high permeability to water can be disposed on a side of the porous membrane 20 that includes the feed chamber 12. By way of further example, an anti-fouling layer can be located on a side of the membrane 20 that is adjacent to the feed chamber 12. In one embodiment, the anti-fouling layer includes polymers, such as polyethyleneglycol. In another embodiment, the anti-fouling layer can be coated on the an ultrafiltration membrane.

In use, as pressure is applied to the water 100, a first meniscus 106 (meniscus A) forms at one side of the pore 22 of the membrane 20 and a second meniscus 108 (meniscus B) forms at another side of the pore 22 of the membrane 20, at least in part because of the differences between the pressures of the feed chamber 12, the permeate chambers 14, and inside the pore 22, respectively. The first and second menisci 106, 108 have radiuses of curvature, $r_A$ and $r_B$, and from force equilibrium, the radiuses of curvatures are further defined as:

$$r_A = \frac{2\gamma}{P_A - P_{pore}} = \frac{2\gamma}{\Delta P_A} \quad (1)$$

$$r_B = \frac{2\gamma}{P_B - P_{pore}} = \frac{2\gamma}{\Delta P_B} \quad (2)$$

where $\gamma$ is surface tension of water, $P_A$ and $P_B$ are pressures at feed and permeate sides, respectively, and $P_{pore}$ is a total pressure inside the pore. As the vapor pressure increases, the curvature of the first and second menisci become larger. In accordance with Kelvin's equation:

$$\ln\frac{P_{vap}^{0,\kappa}}{P_{vap}^0} = \frac{2\gamma V_m}{rRT_s} \quad (3)$$

where $P_{vap}^{0,\kappa}$ is a vapor pressure of pure water with finite curvature, $P_{vap}^0$ indicates a vapor pressure of pure water with no curvature, $V_m$ represents a molar volume of water, r represents the radius of curvature of meniscus, R is a gas constant, and $T_s$ is the temperature. Therefore, $P_{vap,A}^{0,\kappa}$ and $P_{vap,A}^{0,\kappa}$ are vapor pressures of pure water that correspond to the curvature of the first and second menisci, respectively, and can be expressed as follows:

$$P_{vap,A}^{0,\kappa} = P_{vap,A}^0 \exp\left(\frac{2\gamma V_m}{r_A RT_s}\right) = P_{vap,A}^0 \exp\left(\frac{\Delta P_A V_m}{RT_s}\right) \quad (4)$$

$$P_{vap,B}^{0,\kappa} = P_{vap,B}^0 \exp\left(\frac{2\gamma V_m}{r_B RT_s}\right) = P_{vap,B}^0 \exp\left(\frac{\Delta P_B V_m}{RT_s}\right) \quad (5)$$

Vapor pressure on a meniscus can also be dependent on the mole fraction of water according to Raoult's law, which is expressed as:

$$P_{vap} = P_{vap}^{0,\kappa} x_w \quad (6)$$

where $x_w$ is a mole fraction of water at a feed side. In one embodiment, $x_w$ can be expressed as:

$$x_w = \frac{C_w}{C_w + 2C_s} \quad (7)$$

where $C_w$ is the concentration of water in the feed water and $C_s$ is the concentration of salt in the feed water. In one embodiment, the total concentration of sodium and chloride ions is twice as large as that of sodium chloride because one mole of sodium chloride is dissociated to one mole of sodium ions and one mole of chloride ions.

The vapor pressures on the first and second menisci are obtained as:

$$P_{vap,A} = P_{vap}^0 \exp\left(\frac{\Delta P_A V_m}{RT_s}\right) x_w = P_{vap}^0 \left(1 + \frac{\Delta P_A V_m}{RT_s}\right) x_w \quad (8)$$

$$P_{vap,B} = P_{vap}^0 \exp\left(\frac{\Delta P_B V_m}{RT_s}\right) = P_{vap}^0 \left(1 + \frac{\Delta P_B V_m}{RT_s}\right) \quad (9)$$

In the above equations, $T_s$ is the temperature of the interface, $P_{vap,A(B)}$ is the equilibrium vapor pressure of water at the first meniscus (or the second meniscus) at temperature $T_s$, and R is the universal gas constant. Using Kelvin's equation and Raoult's law, the equilibrium vapor pressures at each meniscus can thus be expressed in terms of the pressure drop across the menisci.

The osmotic pressure $\Delta\pi$ for the NaCl concentration considered here (<about 1 M) can thus be obtained as:

$$\Delta\pi = -\frac{RT_s}{V_m}\ln x_w = \frac{RT_s}{V_m}(1 - x_w) \quad (10)$$

Then the vapor pressure difference can expressed as:

$$P_{vap,A} - P_{vap,B} = \frac{(\Delta P - \Delta\pi)V_m}{RT_s} P_{vap}^0 \quad (11)$$

where $\Delta P = \Delta P_A - \Delta P_B$.

Figure 2A:
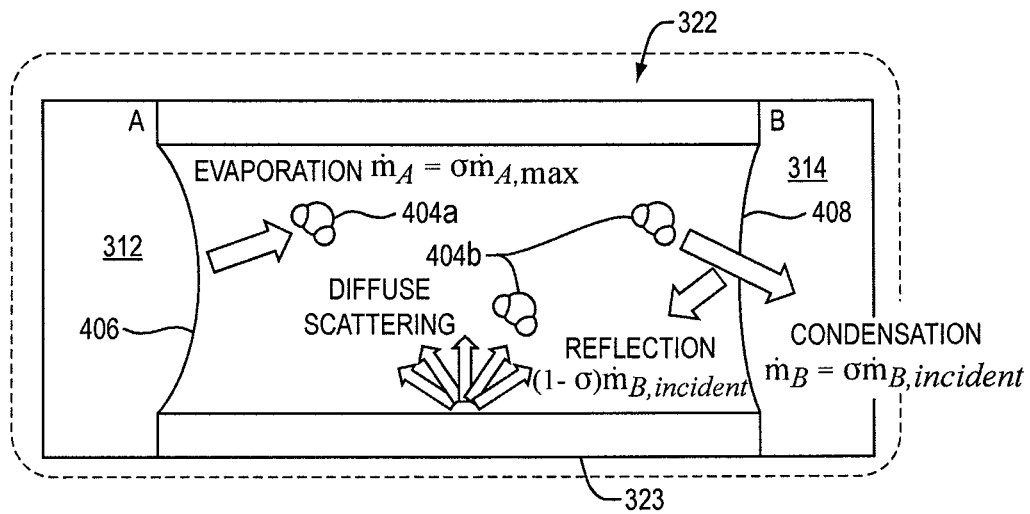
FIG. 2A is a schematic view of one embodiment of a pore of the device of FIG. 1 illustrating multiple phenomena that can occur to a molecule during vapor-phase transport.
Figure 2B:
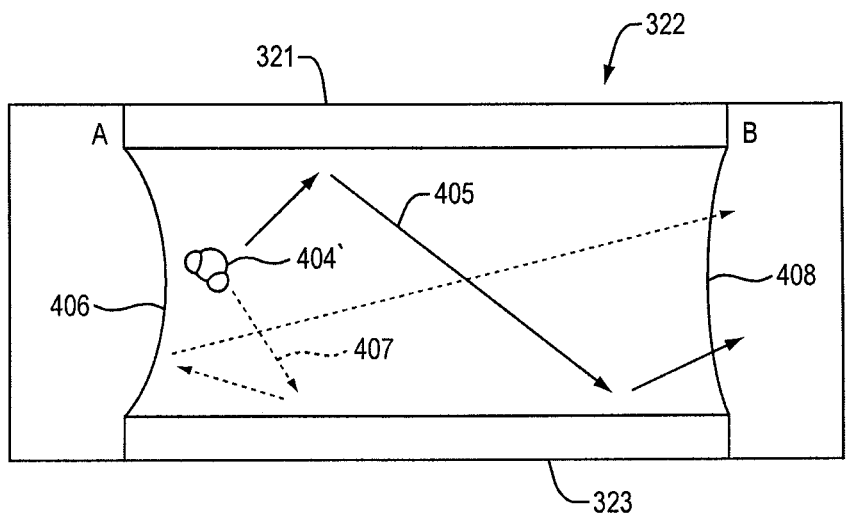
FIG. 2B is a schematic view of the pore of FIG. 2A illustrating multiple possible paths of a molecule.

While a maximum possible flux can be achieved when all molecules that evaporate from one interface condense on an opposite side of the interface, there can be a number of different paths that a molecule follows before condensation. FIGS. 2A and 2B illustrate a variety of phenomena that can occur during vapor-phase transport of molecules 404a, 404b, 404c through a hydrophobic pore 322 in accordance with the present invention. Water molecules evaporating from a liquid-vapor interface can be scattered by pore walls 323, or water molecules can be reflected by menisci 406, 408 before condensation at menisci 406, 408 at either end. In one embodiment a molecule 404a evaporates after it is emitted from the first meniscus 406 proximate a feed chamber 312 and moves toward a permeate chamber 314 disposed on the other side of the pore 322. The actual flux associated with the meniscus 406, $\dot{m}_A$, is equal to a product of a probability of condensation, $\sigma$, and a maximum flux, $\dot{m}_{A,max}$:

$$\dot{m}_A = \sigma \dot{m}_{A,max} \quad (12)$$

In another embodiment a molecule 404b condenses on the second meniscus 408 proximate the permeate chamber 314. The actual flux associated with the second meniscus 408, $\dot{m}_B$, is equal to a product of the probability of condensation, $\sigma$, and an incident flux, $\dot{m}_{B,incident}$:

$$\dot{m}_B = \sigma \dot{m}_{B,incident} \quad (13)$$

Alternatively, the molecule 404b can not condense on the second meniscus 408, and instead can reflect and head back toward the feed chamber 312. The value of a probability of reflection, $1-\sigma$, is determined by the value of the probability of condensation.

In yet another embodiment a molecule 404c can be reflected off the wall 323 of the pore 322 such that diffuse scattering occurs, which is an assumption in Knudsen diffusion phenomena.

FIG. 2B illustrates two examples of possible paths for a molecule 404'. In a first path 405', the molecule 404' deflects off a top wall 321 of the pore 322, deflects off the bottom wall 323 of the pore 322, and then condenses on the second meniscus 408. In a second path 407', the molecule 404' deflects off the bottom wall 323, deflects off the first meniscus 406, and shoots all the way across the pore 322 before condensing on the second meniscus 408. In other instances, the molecule 404' can be transported directly from the first meniscus 406 to the second meniscus 408 and condense without reflecting or deflecting off any wall or menisci.

Figure 3:
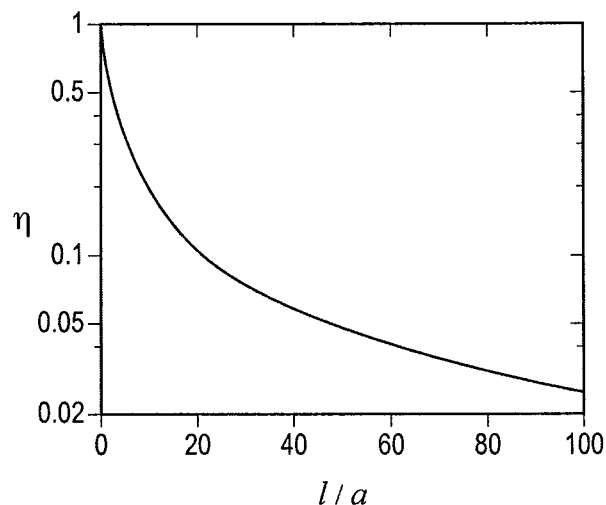
FIG. 3 is a graph illustrating the relationship between transmission probability and a ratio of pore length and pore radius for a pore of the present invention.

A transport probability $\phi_{A,B}$, which is the probability as to whether a molecule emitted from a first meniscus condenses on the second meniscus, for instance by traveling directly between the first and second meniscus or after one or more reflections on at least one of the pore wall and the menisci occurs, can be determined. $\phi_{A,B}$ can be expressed in terms of two different parameters. In one instance a transmission probability parameter $\eta$, which represents the probability that a molecule starting from the first meniscus reaches the second meniscus before colliding with either of the menisci, is used to express $\phi_{A,B}$. The value of $\eta$ depends on the pore aspect ratio, i.e., the ratio of pore length l and pore radius a. As shown in FIG. 3, the value of $\eta$ decreases with the pore aspect ratio. In another instance a condensation probability parameter $\sigma$, which represents the probability that a molecule incident on a meniscus condenses on the meniscus, is used to express $\phi_{A,B}$. The value of $\sigma$ for water is approximately in the range of about 0.5 to about 1. Furthermore, the value is related to a reflection coefficient, which is equal to $1-\sigma$.

The transport probability $\phi_{A,B}$ can be evaluated by considering over all possible paths a molecule can take that evaporates from one meniscus and condenses on another meniscus. FIGS. 4A-4F illustrate some possible paths a molecule 504 emitted from a first meniscus 506 can take before condensing on either the first meniscus 506 or the second meniscus 508. More particularly, FIG. 4A illustrates a possible path in which the molecule 504 is emitted from the first meniscus 506 and returns to the first meniscus 506 after a single deflection. Alternatively, any number of reflections on the pore wall can occur. When a molecule 504 reaches either the first meniscus 506 or the second meniscus 508 at n-th time without condensing before, it is considered the n-th cycle. Therefore, the probability of this molecule reaching the first meniscus 506 is equal to:

$$A_1 = 1 - \eta \quad (14)$$

The probability that the molecule 504 emitted from the first meniscus 506 reaches the second meniscus 508 after the first cycle, as shown in FIG. 4B, is equal to the transmission probability, $\eta$, and thus:

$$B_1 = \eta \quad (15)$$

FIGS. 4C-4F illustrate additional paths that the molecule 504 can take before arriving at the first and second menisci 506, 508. As explained above, in some instances the molecule 504 may never condense on either of the menisci 506, 508. Generally, the probability that the molecule 504 emitted from the first meniscus 506 arrives at and condenses on the first meniscus 506 after "n" cycles is determined using the following equation:

$$A_{n+1} = A_n(1-\sigma)(1-\eta) + B_n(1-\sigma)\eta \quad (16)$$

Likewise, the probability that the molecule 504 emitted from the first meniscus 506 arrives at the second meniscus 508 after "n" cycles is determined using the following equation:

$$B_{n+1} = A_n(1-\sigma)\eta + B_n(1-\sigma)(1-\eta) \quad (17)$$

Accordingly, the transport probability $\phi_{A,B}$ can be obtained as follows:

$$\varphi_{A,B} = \sigma \sum_{n=1}^{\infty} B_n = \frac{\eta}{2\eta(1-\sigma)+\sigma} \quad (18)$$

The rate of evaporation can be related to at least the vapor pressure and the probability of condensation $\sigma$. The rate of absorption of water molecules at a liquid-vapor interface can be equal to a product of the rate of incidence and a probability of condensation, which, at equilibrium, equals the rate of evaporation. For temperatures up to about 50° C., the density of water vapor can deviate from that predicted by kinetic theory of gases by less than about 0.4%. As a result, the kinetic gas theory can be used to estimate the rate of incidence. This is known as the Hertz hypothesis, which gives the rate of gross evaporation per unit area at each meniscus as:

$$\dot{m}_{A(B)} = \sigma \sqrt{\frac{M}{2\pi RT_s}} P_{vap,A(B)} \quad (19)$$

The net mass flux of water through a pore can then be obtained by combining the transport probability $\phi_{A,B}$ and gross rate of evaporation on both interfaces derived from the Hertz hypothesis:

$$\dot{m}_{net} = \phi_{A,B}(\dot{m}_A - \dot{m}_B) \quad (20)$$

Figure 5:
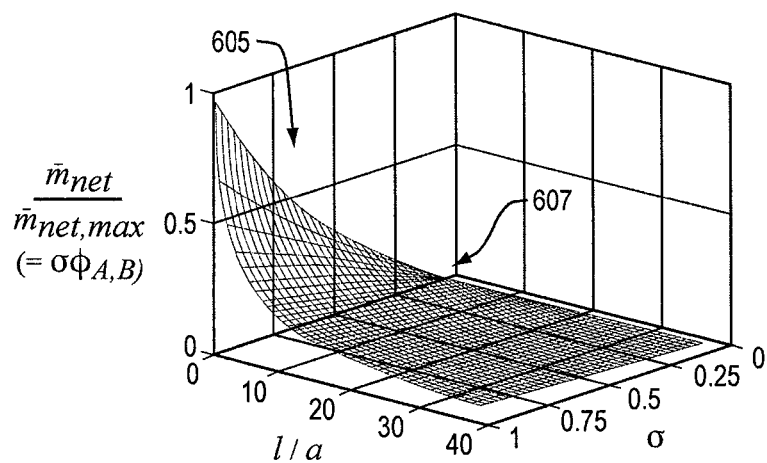
FIG. 5 is a three-dimensional graph illustrating a relationship between a net mass flux of a pore of the present invention normalized by a limiting mass flux through the pore and both a ratio of pore length to pore radius for a pore of the present invention and a condensation probability.

Further, in view of the condensation probability, the transmission probability, Kelvin's equation, and Raoult's law, the net mass flux through a pore can be determined, in association with Equation (11), by the following equation:

$$\dot{m}_{net} = \frac{\sigma\eta}{2\eta(1-\sigma)+\sigma} \sqrt{\frac{M}{2\pi RT}} \left(\frac{\Delta P - \Delta\pi}{RT} V_m\right) P^0_{vap}(T_S) \quad (21)$$

where M is the molar mass of water ($1.8\times10^{-3}$ kg/mol), R is a gas constant (8.31 J/mol-K), T is the temperature, $V_m$ is the molar volume of water (liquid) ($1.8\times10^{-6}$ m$^3$/mol), $P^0_{vap}$ is the vapor pressure of water on a flat surface, $\Delta P$ is the applied pressure difference, and $\Delta\pi$ is the osmotic pressure difference. FIG. 5 illustrates the value of the net mass flux of a pore normalized by a limiting mass flux through a pore, $$\frac{\dot{m}_{net}}{\dot{m}_{net,max}},$$

which is equal to the product of the transport probability $\phi_{A,B}$ and the condensation probability $\sigma$, in view of the ratio of the length to area of the pore l/a and in view of the value of the condensation probability $\sigma$. As shown, mass flux is generally optimized when the condensation probability $\sigma$ is high and the ratio of the length to area of the pore l/a is low. As illustrated, the results in the section labeled 605 are generally optimized when compared to the section labeled 607

Figure 6A:
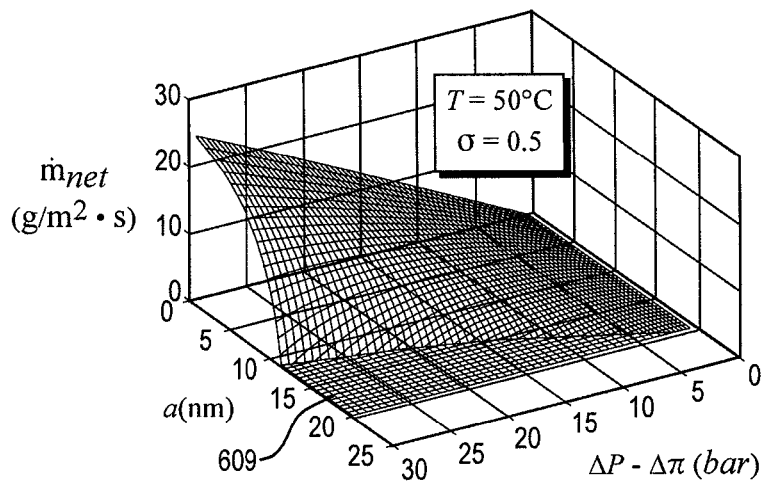
FIG. 6A is a three-dimensional graph illustrating a relationship between a net mass flux of a membrane of the present invention and both a pore radius and a pressure difference between an applied pressure and an osmotic pressure, wherein a condensation probability is 0.5 and a membrane porosity is approximately 40%.
Figure 6B:
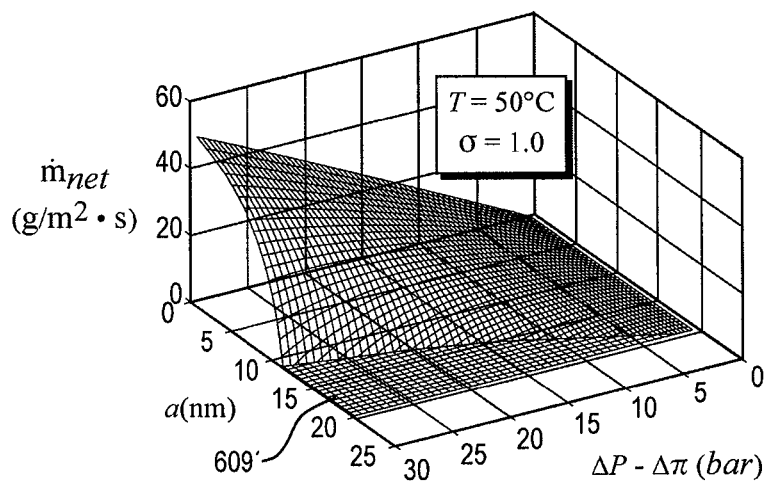
FIG. 6B is a three-dimensional graph illustrating a relationship between a net mass flux of a membrane of the present invention and both a pore radius and a pressure difference between an applied pressure and an osmotic pressure, wherein a condensation probability is 1.0 and a membrane porosity is approximately 40%.

The mass flux through a membrane can also be determined and optimized. This is particularly useful in determining to what degree a hydrophilic membrane is configured to be hydrophobic. FIGS. 6A and 6B illustrate a comparison of a mass flux through a membrane $\dot{m}_{net}$ to both a radius of the membrane a and a difference between the applied pressure difference $\Delta P$ and the osmotic pressure difference $\Delta\pi$. There exists a minimum aspect ratio below which merging of two menisci can be energetically favorable. This is demonstrated by the following equation:

$$\frac{l}{a} > \frac{1}{\cos\theta - \cos\theta_{eq}} \left[\frac{1}{2} + \frac{1}{1+\sin\theta}\right] \quad (22)$$

where $\theta_{eq}$ represents an equilibrium contact angle, $$\cos\theta = \frac{-a\Delta p}{2\gamma},$$

and $\gamma$ represents a surface tension of water.

As illustrated in FIGS. 6A and 6B, the regions that are labeled 609 and 609', respectively, are the regions where the pore radius is not small enough to support the pressure of the system, while the other region is the region of flux that allows a membrane to achieve the desired results. The illustrations in FIGS. 6A and 6B are based on a contact angle of about 120°, a NaCl concentration of about 0.62 M, and a porosity of about 40%. Accordingly, the mass flux through a vapor trapping membrane with the minimum possible aspect ratio that makes wetting unfavorable can approximately range from about 25 g/m$^2$s to about 50 g/m$^2$s at moderately elevated temperatures, which is considerably higher than existing commercial reverse osmosis membranes, which are generally in the range of about 7.7 g/m$^2$s to about 10.6 g/m$^2$s. Further, assuming the parameters as illustrated and discussed herein, a pore radius is preferably about 20 nanometers or less, more preferably about 15 nanometers or less, and even more preferably about 10 nanometers or less. Further, smaller pore radii and/or larger differences between the applied pressure difference and the osmotic pressure difference tend to result in greater flux. The difference between the applied pressure difference and the osmotic pressure difference should always be positive.

Figure 7:
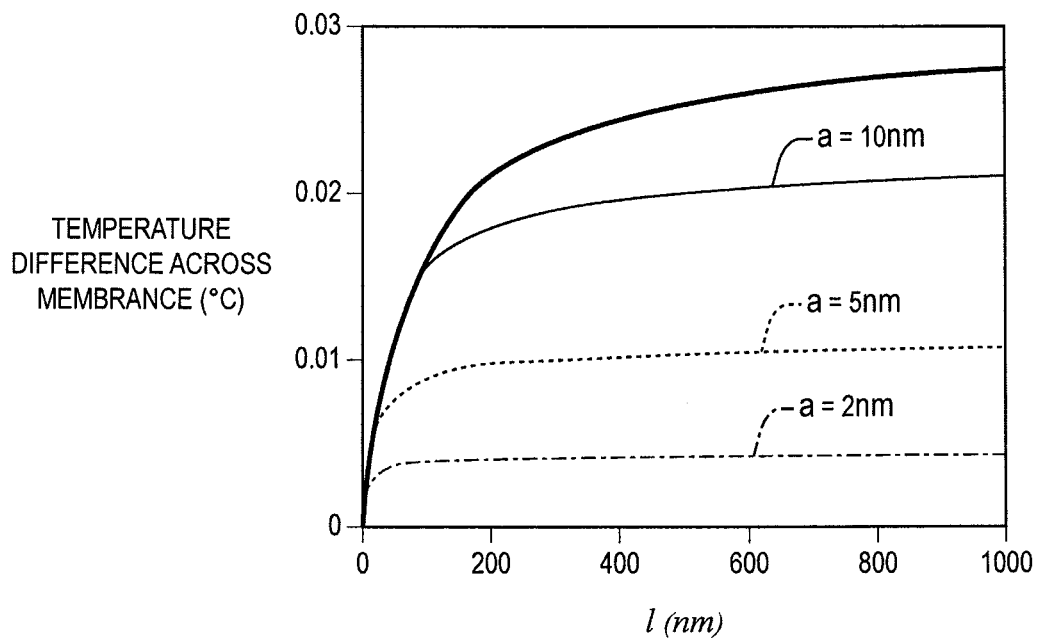
FIG. 7 is a graph illustrating a temperature difference across a membrane balancing latent heat transport and conduction through the membrane.

During operation, evaporation at a feed side and condensation at a permeate side can induce latent heat transport and condensation across a membrane from the feed side to the permeate side. The membrane surface itself, however, can serve as a heat conductor capable of conveying the heat back to the feed side. As illustrated in FIG. 7, considering both heat transfer sources, the temperature difference between the feed side and the permeate side can be in the range of about 0.005° C. to about 0.02° C., and more particularly on the order of about 0.01° C.

As for the shapes and dimensions of the membrane 20 as a whole, it can have a variety of shapes and dimensions dependent on the desired use and output. The shape of the membrane 20 can depend, for example, on the shape of the feed and permeate chambers 12, 14. The membrane 20 can generally be described as thin, although in some embodiments it can have a substantial thickness. Its thickness (illustrated in FIG. 1 as "l") can be approximately in the range of about 10 nanometers to about 5 micrometers. The membrane void thickness for the device of FIG. 1 should be as small as possible to obtain high vapor flux, but it should be larger than the pore diameter to prevent water menisci formed at feed and permeate chambers 12, 14 from merging together.

Further, membrane materials are characterized by their selectivity and permeability, which is a product of the solubility and diffusivity of water in the membrane material. The permeability of typical cellulose acetate and polyamide membranes commonly used polymer material in reverse osmosis is about 0.05-1×10$^{-6}$ g/cm-s. The permeability of air/vapor membranes based on the Knudsen diffusion coefficient, however, is approximately 20-fold higher than these membrane materials, about 1.2×10$^{-6}$ g/cm-s at 30 degrees Celsius. This number can be further enhanced, for instance, by eliminating air by degassing the feed water. Because the present approach utilizes air as a medium for water vapor transport instead of a polymer as used in reverse osmosis, even higher mass flux should be produced based on the difference in permeability. This approach can lead to improvement in mass flux of existing reverse osmosis processes.

Membranes can be fabricated in a number of different manners. In one exemplary embodiment a membrane can be generally hydrophilic and can be modified to include hydrophobic properties, such as to an outside portion of the membrane. For example, the membranes can be formed by block copolymers. The block copolymers can be self-assembled to form either a hydrophilic layer or a hydrophobic of the membrane, for instance by selectively etching one of the blocks of the polymer. In an instance in which a block copolymer is used to prepare a hydrophobic layer, it can be transferred to a hydrophilic support layer. The hydrophobic layer can be coupled to the hydrophilic layer in a number of different manners. In one embodiment, an intermediate support layer can be disposed therebetween. The intermediate support layer can be configured to chemically react with the layers to couple the layers together.

Figure 8:
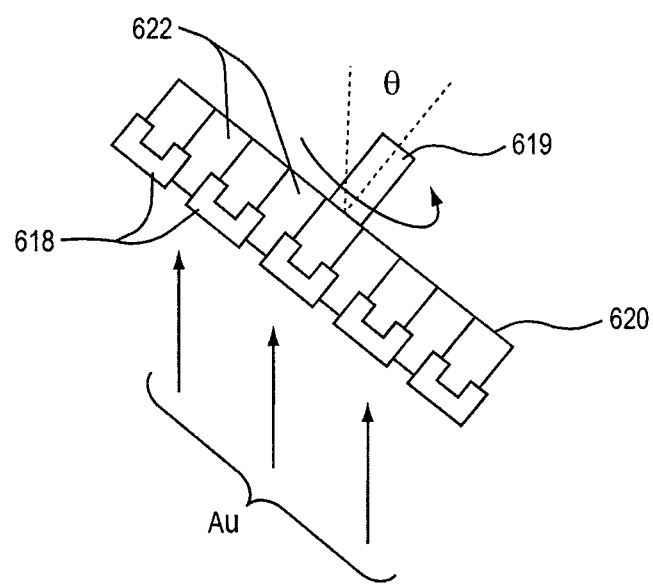
FIG. 8 is a side view of one embodiment of a membrane being coated with gold by an evaporation process for selectively modifying only a section of each pore.

In another embodiment, the block copolymer layer can be self-assembled on a surface and subsequently transferred to a hydrophilic porous layer. In yet another embodiment, the hydrophilic porous layer can be modified to chemically react with the block copolymer layer, thereby facilitating transfer. In still another embodiment, the hydrophobic porous block copolymer layer can be formed on a non-porous substrate that can be subsequently made porous by chemical etching or other processes. Alternatively, if the block copolymer is used to prepare a hydrophilic layer, a hydrophobic layer can be coated directly onto the hydrophilic layer, for example, by sputter-coating at least a portion of the hydrophilic layer with the hydrophobic layer, as shown in FIG. 8. In still another embodiment, techniques such as evaporation can be used to place a hydrophobic material on top of at least a portion of the hydrophilic membrane. In another embodiment, a layer can be selectively coated on a part of the hydrophilic layer. The layer coated on the hydrophilic lay can be subsequently modified to have hydrophobic properties.

In one example the membrane is made of an anodized aluminum oxide. Such a membrane is generally hydrophilic. The membrane is generally circular, and the pores contained therein are generally cylindrical. The pores can be generally uniform, having diameters approximately ranging from about 5 to about 10 nanometers to about 200 nanometers. The membrane begins with a thickness of about 60 micrometers, has a ratio of the length of the pore to the radius of the pore of approximately 600, and it has a porosity approximately in the range of about 25% to about 50%. The provided membrane is subsequently modified to make a thin portion of the membrane hydrophobic. In this embodiment, this was accomplished by using a self-assembled monolayer from thiol molecules that were produced at certain parts of the pores.

Thiols, which are compounds that include a sulfur-hydrogen bond, can include a head group that is hydrophilic and a tail group that is hydrophobic. The sulfur atom in the head group can be used to form a chemical bond with an applied hydrophobic material, such as a metal substrate. In the present example, the thiol is immobilized by forming a gold-sulfur bond on the gold substrate. The degree to which the membrane is hydrophobic is based, at least in part, on the type of tail group associated with the thiol. Examples of tail groups include: —CH$_2$, —CH$_3$, —CF$_2$, —CF$_2$H, —CF$_3$, of which —CF$_3$ has the lowest surface energy. In the present example, perfluorodecanethiol from Sigma Aldrich, which has —CF$_3$ in the tail group, was selected as the hydrophobic material to be coated on the anodized aluminum oxide membrane.

Fabrication of a thin hydrophobic membrane can be realized by deposition of gold into a certain depth of the pores of the membrane, and further, by formation of a self-assembled monolayer on the gold. In the present example membranes 620 were placed on a rotating mechanism 619, such as a wind-up spring clock. The rotating mechanism 619 was then mounted inside a chamber of an electron beam evaporator at an angled position, as shown in FIG. 8. The angle of the membrane can be selected in a manner that allows evaporated gold 618 to be migrated and deposited only near an entrance of pores 622. As a result, a thickness of the hydrophobic part of the membrane 620 can be determined based on the slant angle. In one exemplary embodiment a slant angle θ was selected to be approximately 20° to allow a depth of the gold-coat to be approximately 600 nanometers. In other words, about 200 nanometers per a tangent of about 20° is approximately equal to a thickness of about 600 nanometers.

After the gold 618 has been associated with the hydrophilic membrane 620, the membrane 620 can be rinsed. In one embodiment the gold-coated membranes 620 were rinsed with ethanol for approximately 20 minutes, and then were placed in 1 mM of perflurodecanethiol solution with ethanol as a solvent for approximately 24 hours. The resulting membrane 620 was one that was hydrophobic on one side and hydrophilic on the other side. In one embodiment the result is a hydrophobic, self-assembled monolayer disposed on one or more hydrophilic layers. In an alternative embodiment, one or more membranes can be placed on a glass slide instead of a rotating mechanism. In one such exemplary embodiment a measured advancing contact angle was approximately 108°. Further, although in the present example the hydrophilic membrane 620 was coated with evaporated gold 618, in other embodiments the hydrophilic membrane 620 can be coated with other hydrophobic materials, instead of or in addition to, evaporated gold.

Further, it can be advantageous to incorporate a high-permeability layer on the feed side of a membrane to protect the hydrophobic pores. The membrane can be an ultra-filtration membrane configured to keep proteins or other large molecules out. Further, it can extend the life of the membrane without significantly adding to the resistance to flow. This can be achieved, for example, by including in the membrane a polymer membrane or a ceramic membrane. The resulting membrane can be used in a variety of configurations, including configuration in which reverse osmosis membranes are typically used. By way of non-limiting examples, one or more membranes can be arranged in a parallel stack, a series stack, or can be spiral wound. In fact, any membrane resulting from the teachings herein can be used in any number of configurations, including, without limitation, a parallel stack, a series stack, or in a spiral wound configuration.

Even when fabricated, membranes are generally not free from defects. Further, not all pores end up being modified during fabrication, meaning some of the pores are not hydrophobic. This can at least be because during the process of membrane production, dust particles can prevent the hydrophobic material from coating on the base layer. Further, it is possible that some hydrophobic pores can be wetted during operation of the membrane. It is possible, however, to evaluate the effect of such defects to determine if the resultant defects are detrimental to the use of the membranes in desalination.

Figure 9:
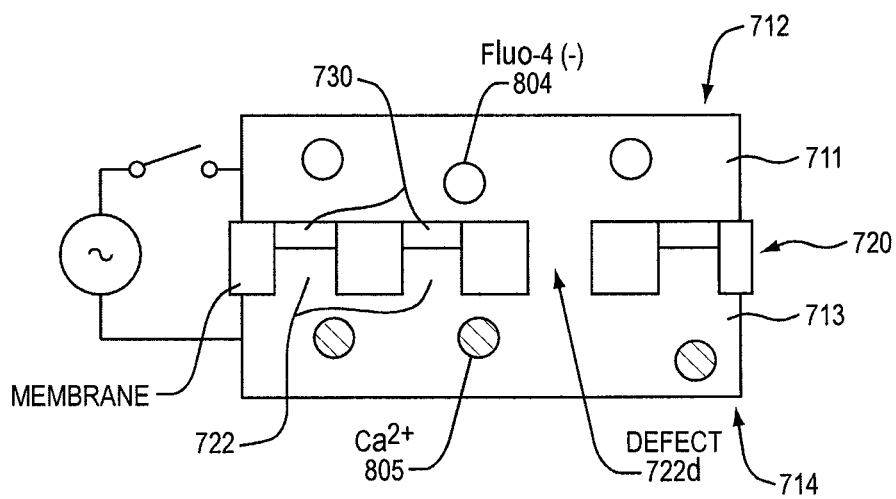
FIG. 9 is a schematic view of one embodiment of a system having a membrane that includes pores in which the system is configured to allow pore defects to be determined.
Figures 10A, 10B:
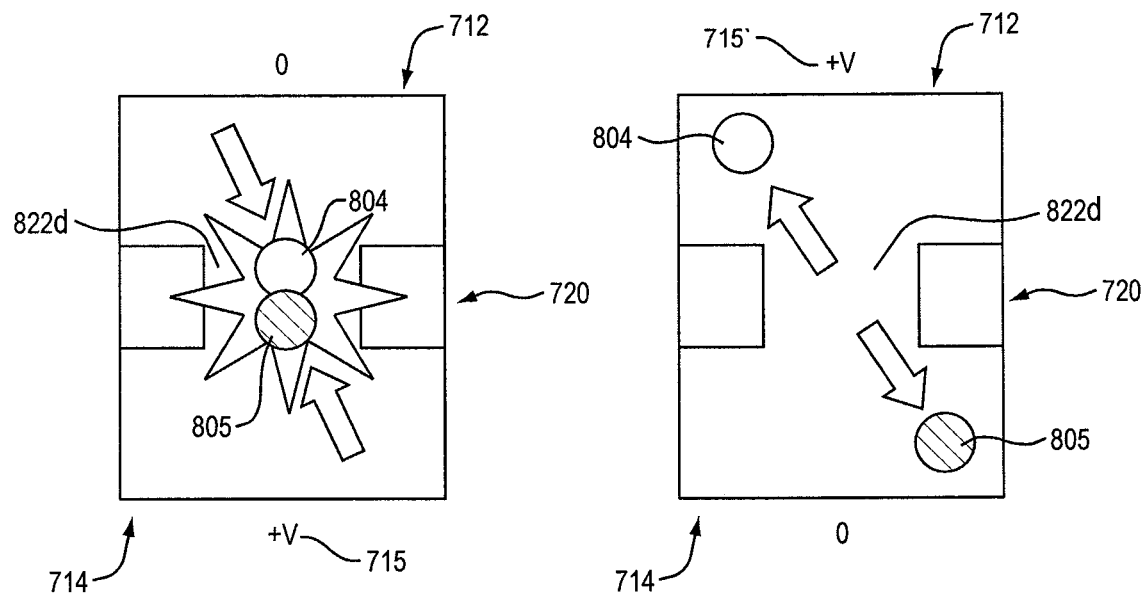
FIG. 10A is a schematic view of one defect pore in the membrane of the system of FIG. 9 in which a location of an applied potential causes molecules disposed on either side of the membrane to collide.
FIG. 10B is a schematic view of one defect pore in the membrane of the system of FIG. 9 in which a location of an applied potential causes molecules disposed on either side of the membrane to move away from each other.

In one such embodiment fluorescent molecules called Fluo-4 from Invitrogen were used to determine a location of defects. Fluo-4 is negatively charged salt and can be used as a calcium indicator because the fluorescent light intensity can be drastically increased when Fluo-4 is bound to a calcium ion. As shown in FIG. 9, two different solutions 711, 713 can be prepared on either side 712, 714 of a manufactured hydrophobic membrane 720 having a plurality of pores 722. A hydrophobic layer 730 covers a plurality of the pores 722, although some defect pores 722d typically remain. On the top side 712 the solution 711 can be composed of about 0.5 mM Fluo-4 and about 0.5 mM EDTA with deionized water as a solvent. On the bottom side 714 the solution 713 can be composed of about 10 mM $CaCl_2$. Given an electrical field, Fluo-4 ions 804 and $Ca^{2+}$ ions 805 can be driven to bind together or can be separated from each other, depending on a direction of the electrical field. As shown in FIG. 10A, when a positive electrical field 715 is located on the bottom side 714, the ions 804, 805 can be driven together where defect pores 822d are located. Further, when a positive electrical field 715' is located on the top side 712, the ions 804, 805 can be driven apart. By capturing the light intensity increase when the two ions 804, 805 are bound together, the locations of defect pores 822d (i.e., open pores) can be determined. In one embodiment a fluorescence image of at least a portion of the membrane is taken to determine the location of defects and the location of defect-free zones. Large defect-free regions, on the order of about 100 micrometers by about 100 micrometers, can be observed. The estimated fraction of wetted pores can approximately be in the range of about one pore in about $10^5$ to $10^6$ pores. The number of defects in a membrane, however, can be reduced by optimization of the fabrication process.

Figure 11A:
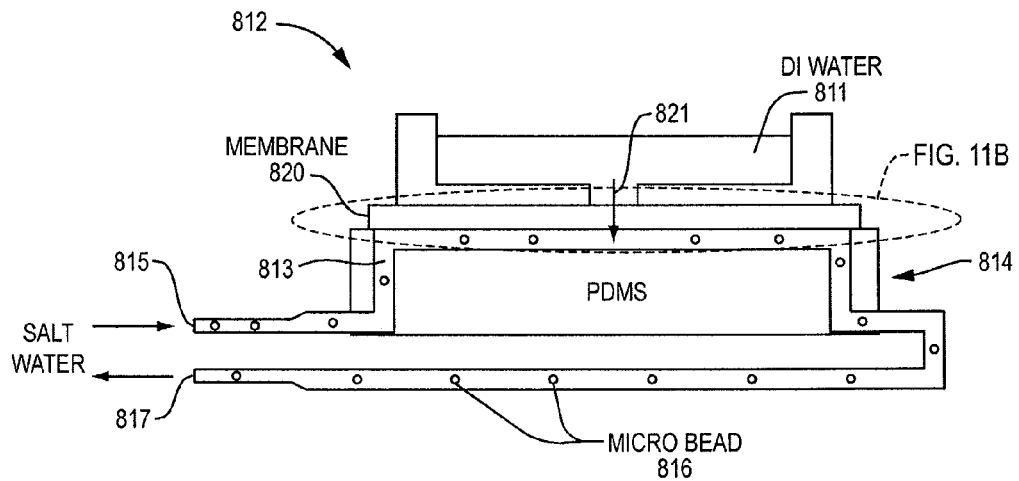
FIG. 11A is a schematic diagram of one set-up for measuring flux from forward osmosis.
Figure 11B:
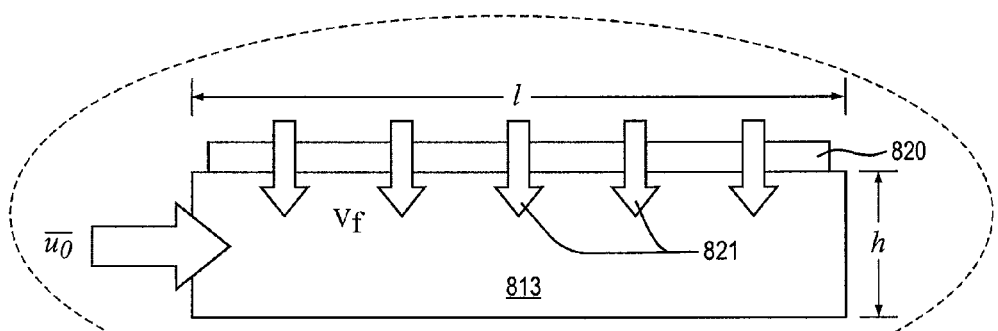
FIG. 11B is an enlarged view of a portion of FIG. 11A that includes the membrane, permeate flow through the membrane, and the salt water stream.

Once substantially defect-free regions are determined, flux measurements using forward osmosis can be performed on the substantially defect-free regions. Generally a region that has approximately 1% defects or less is preferred. FIGS. 11A and 11B illustrate one experimental set-up that can be useful to perform the forward osmosis. A chamber on an upper side 812 includes deionized water 811 and a lower side 814 includes a stream of salt water 813. The upper and lower sides 812, 814 are separated by a hydrophobic membrane 820. The deionized water 811 can be transported through the membrane 820 and into the salt water stream 813, for instance, by an osmotic pressure. Because in such an embodiment there is no physical force acting on the membrane 820, mechanical damage is not generally an issue. In one embodiment, as shown in FIG. 11A, microbeads 816 can be injected into the salt water stream 813, which can allow a mass flux through the membrane 820 to be measured by comparing the beads 816 velocity at an inlet 815 and an outlet 817. FIG. 11B illustrates an enlarged portion of FIG. 11A that includes the membrane 820, permeate flow 821 through the membrane, and the salt water stream 813. In one embodiment when the salt concentration is approximately 0.62 M, which is generally the same total dissolved solutes as seawater, the flow velocity through the membrane 820 due to the osmotic pressure can be approximately 5 micrometers per second.

As the deionized water 811 is transported through the membrane 820, however, the salt stream 813 can be diluted and then the permeate flux can be decreased because of the reduced osmotic pressure. Thus, the appropriate design parameters such as the size of measured location, channel height of the salt water stream 813, and salt water stream 813 velocity can be determined to prevent the effect of the reduced concentration. In this particular embodiment, the velocity of the permeate flow 821 through the membrane 820 was assumed to be constant, although that may not necessarily be the case. The velocity distribution of the salt water stream 813 can be determined by solving the Navier-Stokes equation and continuity equation assuming that inertial effect is negligible due to the small scale of the given geometry. Then:

$$\frac{u}{\bar{u}} = 6\left[\frac{y}{h} - \left(\frac{y}{h}\right)^2\right] \quad (23)$$

$$\frac{d\bar{u}}{dx} = \frac{v_f}{h} \quad (24)$$

$$\frac{v}{v_f} = -3\left(\frac{y}{h}\right)^2 + 2\left(\frac{y}{h}\right)^3 \quad (25)$$

where u and v are the velocity of the salt water stream 813 in the x and y directions, respectively, $\bar{u}$ is the average velocity of the salt water stream 813, $v_f$ is the permeate flow 821 velocity, and h is the height of the channel of the water stream 813. Given the above velocity distribution, a concentration profile can be obtained by solving the continuity equation for salt concentration as the following:

$$u\frac{\partial C_S}{\partial x} + v\frac{\partial C_S}{\partial y} = D\frac{\partial^2 C_S}{\partial y^2} \quad (26)$$

with boundary conditions at x=0: $C_s=C_{s0}$, at y=0: $N_y=0$, v=0, and at y=h: $N_y=0$, $v=-v_f$, where $C_s$ is salt concentration, $C_{s0}$ is the concentration of the incoming stream, and $N_y$ is mole flux of salt in the y-direction, which is given by $N_y=-D(\partial C_s/\partial y)+vC_s$.

Figure 12:
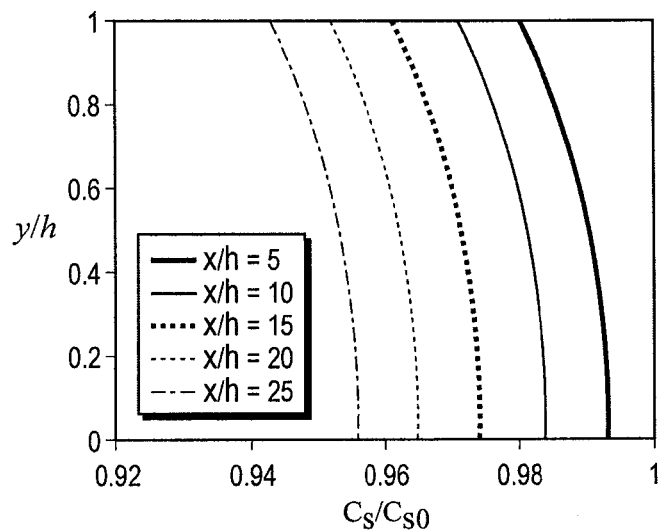
FIG. 12 is a graph illustrating theoretically calculated salt concentrations using the set-up for measuring flux from forward osmosis illustrated in FIG. 11A.

FIG. 12 illustrates a concentration profile in which l is about 500 micrometers, h is about 20 micrometers, and $\bar{u}_0$ about 1 millimeter per second, where $\bar{u}_0$ indicates an average velocity of the incoming salt water stream. The membrane porosity is generally about 40 percent and D is about $1.5 \times 10^{-9}$ m²/s. For the given geometry, the dilution effect is not generally large.

Although fabrication is preferably done in a sophisticated manner in order to avoid defective pores, it can be difficult to totally avoid defective pores. Thus, when using a hydrophobic membrane in a system as described, it can be important to estimate the contribution of salt water flow to the purity of the product water. Using Taylor series expansion of the mass flux through a hydrophobic pore as indicated above yields the following:

$$\frac{\dot{m}_{vap}}{\Delta p} = \frac{\sigma\eta}{2\eta(1-\sigma)+\sigma}\sqrt{\frac{M}{2\pi RT_S}}\frac{P^0_{vap}(T_S)V_m}{RT_S}\left(1 - \frac{\Delta\pi}{\Delta p}\right) \quad (27)$$

Assuming Hagen-Poiseuille flow inside a defective pore, the mass flux transported as liquid per unit ΔP through the defective pores can be expressed as:

$$\frac{\dot{m}_{liq}}{\Delta p} = \frac{a_d^2}{8vl_m} \quad (28)$$

where v is kinematic viscosity of water, $l_m$ is a membrane thickness, and $a_d$ is the radius of defective pores. The value of $a_d$ should be equal to a radius of other normal pores a unless a treatment is performed. If the number of defective pores is α and that of the other hydrophobic pores is β, the salt rejection can be given by:

$$SR = 1 - \frac{C_{s,p}}{C_{s,f}} = 1 - \frac{(\pi a_d^2)(\alpha\dot{m}_{liq})}{(\pi a_d^2)\alpha\dot{m}_{liq} + (\pi a^2)\beta\dot{m}_{vap}} \quad (29)$$

where $C_{s,f}$ and $C_{s,p}$ are salt concentrations at feed and permeate sides, respectively. A ratio of normal to defective pores, i.e., β/α in order to insure to have more than about 99% of salt rejection SR is then:

$$\frac{\alpha/\beta}{\alpha/\beta + \dot{m}_{vap}/\dot{m}_{liq}(a/a_d)^2} \le 0.01 \rightarrow \frac{\beta}{\alpha} \ge 99\frac{\dot{m}_{liq}}{\dot{m}_{vap}}\left(\frac{a_d}{a}\right)^2 \quad (30)$$

and therefore:

$$\frac{\beta}{\alpha} \ge \frac{99a_d^2}{8vl_m}\left(\frac{a_d}{a}\right)^2\left[\frac{\sigma\eta}{2\eta(1-\sigma)+\sigma}\sqrt{\frac{M}{2\pi RT_S}}\frac{P^0_{vap}(T_S)V_m}{RT_S}\left(1-\frac{\Delta\pi}{\Delta p}\right)\right]^{-1} \quad (31)$$

Figure 13A:
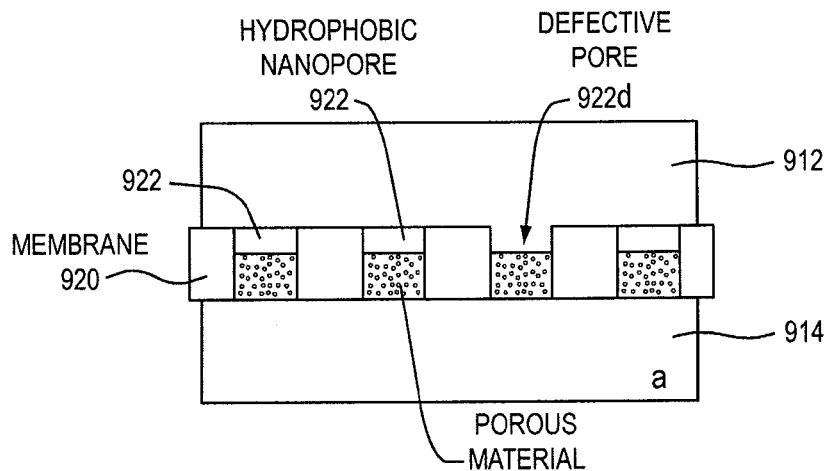
FIG. 13A is a schematic view of one embodiment of a membrane having a hydrophobic layer, at least one defective pore, and a porous filler material configured to control resistance of a hydrophobic portion of the pores.
Figure 13B:
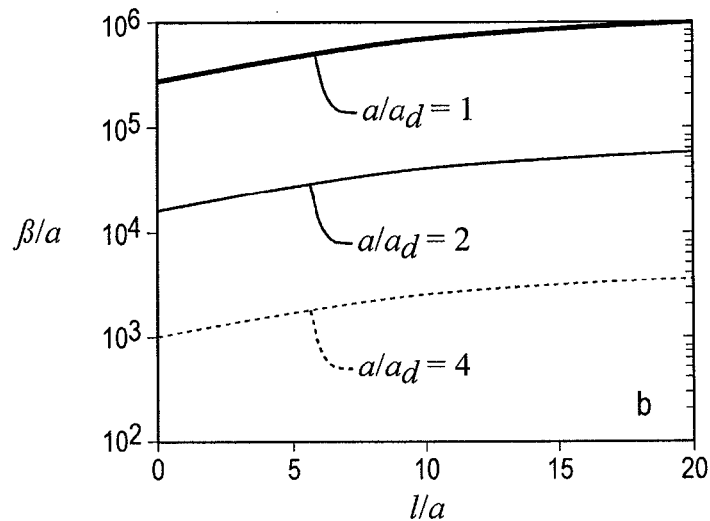
FIG. 13B is a graph illustrating a relationship between a ratio of the number of normal pores to the number of defective pores required to maintain an approximately 99% salt rejection ($\beta/\alpha$) and the ratio of radii of normal pore versus defective pores ($a/a_d$), wherein a membrane thickness is about 60 micrometers, $\Delta\pi/\Delta P$ is about 0.6, $T_s$ is about 30° C., and a is about 100 nanometers.

The required condition for ratio β/α to obtain high salt rejection can be relieved by controlling the resistance to liquid flow of the pores. The resistance to liquid flow can be increased if the hydrophilic part of the pores is blocked by porous or semi-permeable material such as polymer or ceramic. This concept is illustrated in FIG. 13A, which includes a membrane 920 disposed between a feed chamber 912 and a permeate chamber 914. The membrane 920 includes hydrophobic pores 922, and at least one defective pore 922d. A radius of each pore is a and the effective pore radius of the porous material is given as $a_d$. FIG. 13B illustrates the β/α ratio as a/$a_d$ varies. Where a radius of the normal pores is a, the β/α ratio required to maintain about 99% salt rejection reduces with the fourth power of a/$a_d$. This can result in an effective way of treatment to keep high salt rejection. Alternatively, the resistance to flow can be controlled by increasing a length of the hydrophilic portion of the pore, or by controlling both a length of the pore and a diameter of the pore.

Thus, to increase defect tolerance, the resistance to flow of liquid water can be increased so that it is a significant, but small fraction (e.g., less than about 10 percent or less than about 1 percent) of the resistance to flow across the hydrophobic pore. Therefore, in case a defect occurs, it will not result in a large leakage of feed water. Alternatively, the total resistance to flow is likely due to the liquid-filled section ($R_{liquid}$) and due to the hydrophobic pore ($R_{vapor}$), which are arranged in series. For a normal pore, the flow rate (Q) is given by:

$$Q_{normal} = \frac{(\Delta P - \Delta\pi)}{(R_{liquid} + R_{vapor})} \quad (32)$$

When a defect occurs, $R_{vapor} \approx 0$, the flow rate through the defective pore is:

$$Q_{defect} = \frac{(\Delta P - \Delta\pi)}{R_{liquid}} \quad (33)$$

However, this flow contains salt, and thus should be minimized. Accordingly, if $R_{liquid}$ is increased for all pores, because it is unknown which pores are defective, $Q_{defect}$ can be decreased without significantly affecting $Q_{normal}$, because in such a situation $R_{liquid} \ll R_{vapor}$.

For example, in an embodiment in which ΔP−Δπ=1, $R_{liquid}$=0.1, and $R_{vapor}$=100, $Q_{normal}$=1/(1+100)=0.0099 and $Q_{defect}$=1/0.1=10. Thus, leakage has severe consequences. However, if the resistance to liquid flow were increased to 10, then $Q_{normal}$=1/(10+100)=0.0091, which is a decrease of approximately 8%, and $Q_{defect}$=1/10=0.1, which is a decrease of approximately 99%. Accordingly, a membrane can be made defect-tolerant by adjusting a hydrodynamic resistance to water flow of hydrophilic portions of pores of the membrane to a certain fraction of the resistance of hydrophobic portions of the pores of the membrane, and as a result, leakage of feed water through any defective pores of the membrane can be minimized. Further, after a membrane has been used, it can be advantageous to rinse and dry the membrane in order to restore wetted pores to a non-wetted state.

As discussed above, the pressure-inducing component can be a variety of different structures and devices, but in the illustrated embodiment of FIG. 1 it is the piston 16. Because the devices and methods rely on the generation of a pressure in the water 100 sufficient to produce a difference in the vapor pressure across the membrane 20, the generated pressure is quite large. The resulting pressure should generally be large enough to overcome the osmotic pressure. In one embodiment, the resulting pressure can be approximately at least 30 atmospheres. Such an embodiment would be useful for sea water, for example, because the osmotic pressure of sea water is approximately 30 atmospheres. In another embodiment the resulting pressure can be approximately at least 50 atmospheres, or even greater in other embodiments. For brackish water, the resulting pressure can be significantly less, for example, on the order of about 5 atmospheres or more. In any embodiment, the applied pressure should exceed the osmotic pressure.

In some instances, some of which are described herein, the membrane can be used in conjunction with forward osmosis, for instance, in the exchange of salt. In such an instance, the applied pressure can be as low as zero, or may be greater than or less than the osmotic pressure. Forward osmosis to exchange salt can then be followed by reverse osmosis. This process can allow water to be purified and is a variant of the traditional reverse osmosis process.

The pressure difference that results from the pressure-inducing component generates a vapor pressure difference across a gap or void, which in turn results in transport of water vapor across the membrane 20. This process is approximately or nearly isothermal, thereby eliminating thermal losses that occur in membrane distillation processes. By way of non-limiting example, in one embodiment the device 10 is operable at temperatures of approximately 95° C. or less. The total pressure inside the pore 22 is expected to have a value ranging from vapor pressure to the atmospheric pressure, depending on the amount of dissolved gases in the water 100. The diameter of the pores 22 is generally the same or less than the mean free path of the molecules according to kinetic theory. Therefore, the Knudsen diffusion phenomenon is dominant as compared to ordinary molecular diffusion under the considered pressure.

Alternatively, rather than apply a pressure to a liquid substance disposed in the feed chamber to cause the liquid to pass as a vapor from the feed chamber to the liquid-filled permeate chamber, osmotic pressure from the liquid disposed in the permeate chamber can be used to transport the liquid from the feed chamber to the permeate chamber. For example, the liquid disposed in the permeate chamber can include a solute. The solute can introduce an osmotic pressure difference that can allow the liquid to pass as vapor from the feed chamber to the permeate chamber under the influence of the osmotic pressure difference.

In a reverse osmosis procedure, a membrane generally consists of a thin and dense skin layer and a thick porous layer. The permeability of water is mainly determined by the skin layer and the thick porous layer has a role of supporting the skin layer. Typically, the thickness of the skin layer approximately ranges from less than about 0.1 micrometers to about 1 micrometer. Based on the same membrane thickness as the thickness of the skin layer of about 40 nanometers, which was used in a reverse osmosis experiment by Riley et al. as described in an article entitled "Composite Membranes for Seawater Desalination by Reverse Osmosis" in the *Journal of Applied Polymer Science* in 1971, volume 15, pages 1267-1276, the teachings of which are incorporated by reference in their entirety, the calculated mass flux of water vapor using the present devices and methods with the Knudsen diffusion coefficient being about $4.0 \times 10^{-6}$ m$^2$/s (as calculated for water vapor based on the temperature 30° C. and the pore diameter of 20 nanometers) is about 16.7 g/m$^2$-s. This value is about 10 times larger than that of reverse osmosis from the experiment by Riley et al., about 1.5 g/m$^2$-s under almost the same net pressure across the membrane (the net pressure across the membrane indicates the pressure difference of applied pressure and osmotic one; the calculation in the present devices and methods is based on the net pressure around 20 bar).

Figure 14:
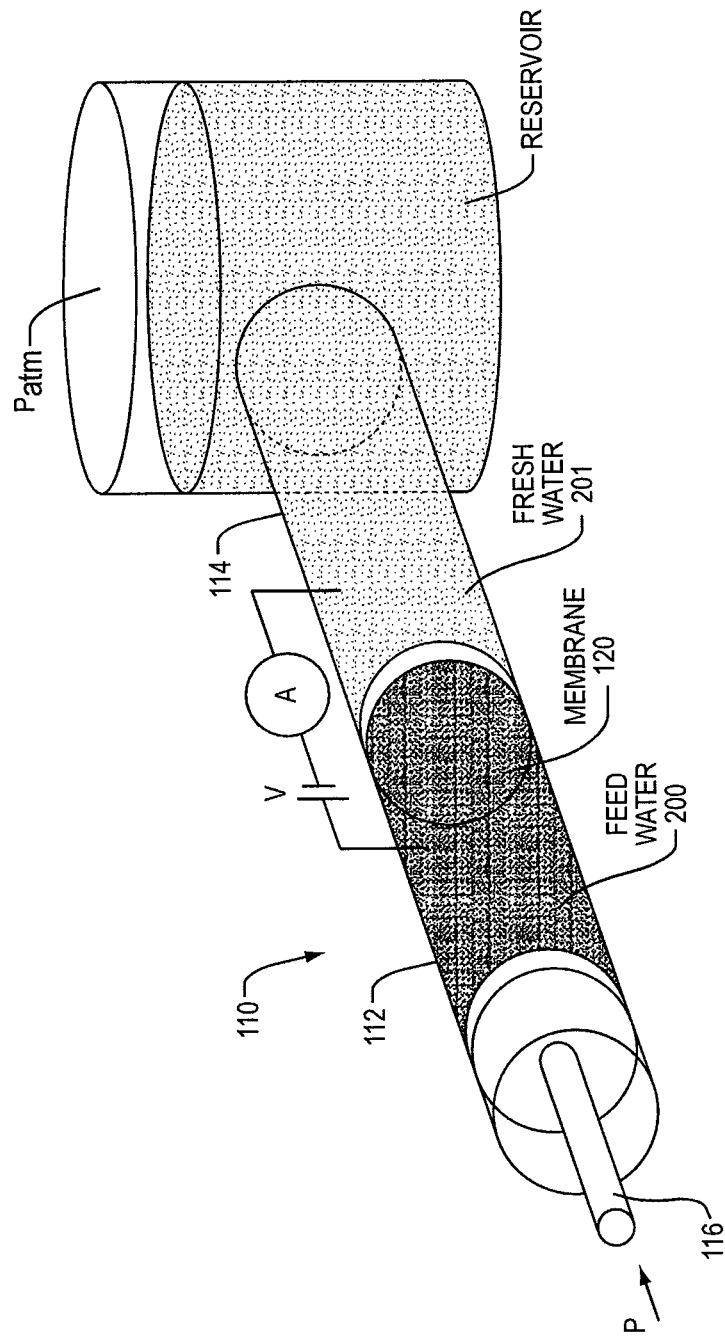
FIG. 14 is a schematic view of another embodiment of a device for filtering a liquid substance, wherein a feed chamber and a permeate chamber are disposed in a tube.

One embodiment of the claimed devices and methods is schematically illustrated in FIG. 14. A cylinder or tube 110 is filled with salt water 200 and distilled fresh water 201 at each side, divided by a membrane 120. The salt water 200 is located on a feed side 112 and the distilled fresh water on a permeate side 114. Initially, air vapor in the salt water 200 and fresh water 201 may be removed by a vacuum pump to eliminate the air transport effect inside pores of the membrane 120. The illustrated membrane 120 includes thin alumina membranes with nanopores (chemically modified to make them hydrophobic) with a thickness of approximately 1 micrometer. One of the advantages of an alumina membrane is that straight pores can be fabricated, which makes the analysis simpler and allows relatively easy evaluation of its validity comparing with the experiment. The total cross-section area of the pores is around 40 percent of the whole membrane area. A piston 116 is installed in the feed side 112 to apply pressure higher than osmotic pressure. The initial feed salt water 200 is set up to have the average salt concentration of sea water, about 3.5 wt % where the osmotic pressure is almost 30 bar. According to Raoult's law, the vapor pressure is reduced and osmotic pressure is increased as the salt concentration becomes higher. The mass flux throughout the pores on the constant applied pressure by the piston 116 decreases as the desalination process proceeds. In order to check any leakage through the pores, an electrical source and ampere meter can be installed to measure an electrical current generated by ion transports from feed to permeate sides 112, 114. If a large current is perceived, it tells that salt water 200 is leaked through the pores.

One main advantage to the present devices and methods is that, unlike direct contact membrane distillation, heat loss is not a concern. In direct contact membrane distillation, the heat loss across the membrane can be roughly calculated with the parameters from literature written by people such as Kevin W. Larson, D. R. L., in an article entitled "Membrane Distillation II. Direct Contact MD" in the *Journal of Membrane Science* in 1996, volume 120, pages 123-133 and Surapit Srisurichan, et al., in an article entitled "Mass Transfer Mechanisms and Transport Resistances in Direct Contact Membrane Distillation Process" in the *Journal of Membrane Science* in 2006, volume 277, pages 186-194, the teachings of which are incorporated by reference in their entireties. According to the parameters used by Srisurichan, et al., the rate of heat loss per unit area is about $1.6 \times 10^4$ W/m$^2$ when the temperature difference between feed and permeate side with membrane thickness of about 125 micrometers is about 50° C. and the corresponding mass flux is about 16.1 g/m$^2$-s. This implies that the energy loss per one gram of produced water is about $1.0 \times 10^3$ J/g, which is huge compared to the theoretical minimum energy required to desalinate sea water, about 3-7 J/g as calculated by J. E. Miller in *Review of Water Resources and Desalination Technologies* for Sandia National Laboratories in 2003, pages 1-54, the teachings of which are incorporated by reference in their entirety. The present approach removes this heat loss source by introducing pressure difference.

Figure 15:
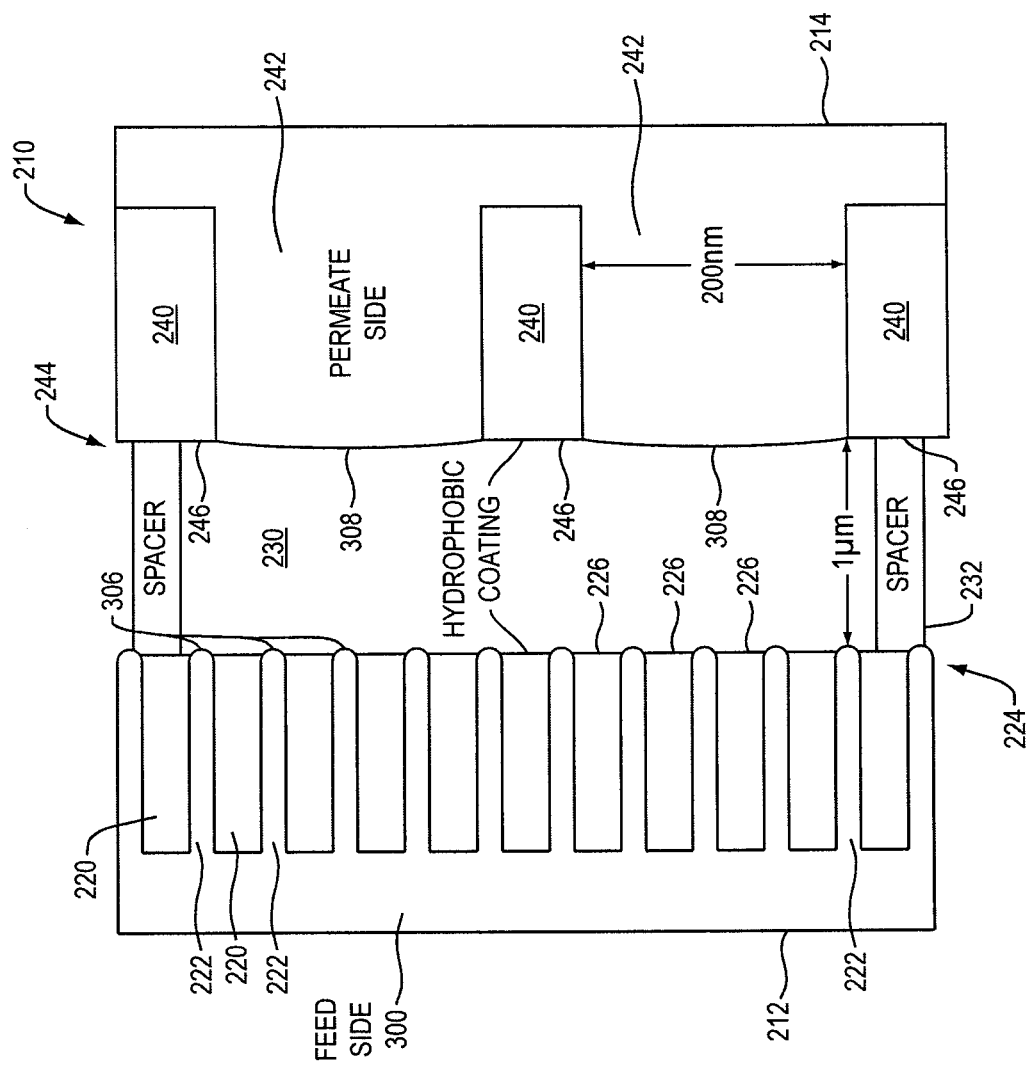
FIG. 15 is a schematic view of another embodiment of a device for filtering liquid, wherein the device includes a plurality of membranes.

Another exemplary embodiment of a device 210 for filtering a liquid is illustrated in FIG. 15. It includes a feed chamber 212, a permeated chamber 214, and two porous membranes 220, 240 disposed therebetween. Each of the two porous membranes 220, 240 are at least partially hydrophobic and include one or more pores 222, 242 that are configured to be permeable to vapor. Although not illustrated, similar to the device 10, the device 210 can further include one or more pressure-inducing components configured to apply a pressure to water 300 disposed in the feed chamber 212. As pressure is applied to the water 300, the water 300 is transported from the feed chamber 212 to the permeate chamber 214 in vapor form. The water 300 can pass through each of the porous membranes 220, 240 in vapor form, via the one or more pores 222, 242 of the membranes 220, 240, respectively, to arrive in the permeate chamber 214. While the illustrated embodiment includes two porous membranes 220, 240, in other embodiments more than two porous membranes can be disposed therebetween. As illustrated, the two porous membranes 220, 240 are spaced apart such that vapor passing from the feed chamber 212 to the permeate chamber 214 can do so with less flow resistance. Similar to device 10, particles disposed in the water 300 cannot pass through the first porous membrane 220. In one embodiment, sides 224, 244 of each of the first and second membranes 220, 240 that face each other are coated with a hydrophobic material 226, 246 such that water in liquid form cannot pass from either the feed chamber 212 or the permeate chamber 214 and into a void or gap 230 formed by the space between the two porous membranes 220, 240.

Generally, each of the feed chamber 212, the permeate chamber 214, and the pressure-inducing components of the device 210 include features similar to the corresponding components of the device 10. Likewise, each of the first and second porous membranes 220, 240 have features similar to the porous membrane 20 of the device 10. Accordingly, by way of non-limiting example, each of the first and second porous membranes 220, 240 can be comprised of both hydrophilic and hydrophobic materials.

One optional feature of the device 210 that is not illustrated in the device 10 is one or more spacers 232 which can be disposed between the first and second porous membranes 220, 240. The spacers 232 assist in forming the gap 230 between the first and second membranes 220, 240, and can be made from any number of materials, such as nanoparticles. A distance of the gap 230 between the two membranes 220, 240 is generally larger than at least one of the diameters of the pores 242 of the second porous membrane 240. For example, in one embodiment, the diameter of at least one of the pores 242 of the second porous membrane 240 is approximately 200 nanometers or less, while a distance of the gap 230 between the first and second membranes 220, 240 is approximately in the range of greater than about 200 nanometers to about 1 micrometer.

Similar to the dimensions of the diameters of the pores 222, 242, the length of the gap 230 can depend on a variety of factors and can be adjusted depending on the intended use. While a range of about 200 nanometers to about 1 micrometer is provided as an example above, in other instances the length could be smaller or larger than the example range. Further, generally a diameter of the pores 222 of the first membrane 220 is smaller than a diameter of the pores 242 of the second membrane 240. For example, in one embodiment, the diameter of at least one of the diameters of the pores 222 of the first porous membrane 220 is approximately 20 nanometers or less and a diameter of at least one of the pores 242 of the second membrane 240 is approximately in the range of greater than about 20 nanometers to about 200 nanometers. Again, while particular dimensions of the pores 222, 242 are used as one example, a variety of factors can affect the desired size of the pores 222, 242 of either or both of the first and second membranes 220, 240. Accordingly, there may be instances in which the diameters of the pores 222, 242 are smaller or greater than the values provided in the example, and further, it is possible that diameter of at least one of the pores 222 of the first membrane 220 is equal to or even greater than the diameter of at least one of the pores 242 of the second membrane 240. In one embodiment, a thickness of the first membrane 220 is small, for instances approximately less than about 100 micrometers, or alternatively approximately less than about 10 micrometers, or further alternatively approximately less than about 1 micrometers, which in turn can assist in decreasing a concentration polarization, for instance a build-up of a salt layer. In one embodiment the feed side can include one or more mechanisms configured to stir the feed solution.

In use, similar to the device 10, as pressure is applied to the water 300, a first meniscus 306 forms at the side 224 of the first membrane 220 and a second meniscus 308 forms at the side 244 of the second membrane 240. The properties of the first and second menisci 306, 308 are similar to the properties of the first and second menisci 106, 108 formed in conjunction with the use of the device 10.

While different geometries of pore sizes and gap distances can be used, the preferred geometry includes an entrance with a small diameter and pathway with larger diameter or space because it can achieve higher fluxes. This is because the Knudsen diffusion flux is determined by the pore diameter. For example, when the pore diameter of the first membrane 220 is approximately 20 nanometers to allow for sustaining high applied pressure, the pore diameter of the second membrane 240 can be selected to be much larger to provide sufficient size of water menisci for water molecules emitted from the feed chamber to settle down. By introducing the gap 230 between two membranes 220, 240, Knudsen diffusion limit, which is caused by existence of a wall, can be removed and higher vapor flux can be obtained.

Further, the vapor flux can be increased as the gap distance is decreased. The gap distance, however, should typically be large enough to prevent the second meniscus 308 from touching the other side or being merged with the first meniscus 306 due to the tendency toward surface energy reduction. Accordingly, to maintain the menisci 306, 308 at both sides separate, the gap distance should be at least larger than the diameter of the pores 222, 242 at both sides. Thus, in the earlier example in which the pore diameter of the first membrane 220 is approximately 20 nanometers, the pore diameter of the second membrane 240 can be approximately 200 nanometers with which the second meniscus 308 at the permeate chamber 314 may be a sufficiently large receiver for water vapor transported from the feed chamber 212, regardless of the arrangement of the pores 222 at the feed chamber 212, and the gap distance can be approximately 1 micrometer, which is the same order of and larger than the pore diameter of second membrane 240 at the same time.

The maximum flux can be achieved when the air inside the gap 230 is completely degassed. Degassing can be performed using a variety of different components and techniques, but in one example, the gap 230 between the two membranes 220, 240 can be heated. In another example, a lower pressure can be applied to the gap 230. In yet another example, the feed water can be degassed by applying a vacuum prior to introducing the feed water into the feed chamber 212. Then there is no air molecule obstructing water vapor molecule so that the calculated flux in this case is about 89.2 $g/m^2 s$, which is almost 20 times larger than commercial reverse osmosis flux.

The spacers 232 sustain the two membranes 220, 240 to keep appropriate gap distance, but they also be configured to conduct heat to convey heat back to the feed chamber 212 from the permeate chamber 214. Thus, in one embodiment, the spacers 232 have good thermal conductivity to maintain temperature difference low, for example 0.1 K, between the feed and permeate chambers. By way of non-limiting example, considering an alumina spacer coated with Teflon, the required portion of area taken by the spacers 232 to the whole membrane surface area should be larger than approximately 5 percent to keep the temperature difference lower than about 0.1 K.

In summary, the pore diameter and membrane thickness, or gap distance as described with respect to the device 210 of FIG. 15, are determined by other factors considering trade-offs for each value. In the membrane with cylindrical pores, illustrated in FIG. 1, the vapor flux is increased as the pore diameter becomes larger. The pore diameter, however, is generally small enough to sustain high applied pressure. Thus, the pore diameter is determined primarily by applied pressure, which is generally larger than osmotic pressure, and is typically less than approximately 30 nanometers for typical sea water. The membrane void thickness for the device 10 of FIG. 1 should to be as small as possible to obtain high vapor flux, but it should be larger than the pore diameter to prevent water menisci 106, 108 at feed and permeate chambers 12, 14 from merging together. Removal of air by degassing can slightly improve the flux. The flux, however, is ultimately limited by Knudsen diffusion.

A design of a device 210 that includes two membranes 220, 240, illustrated in FIG. 15, removes the Knudsen diffusion limit by introducing the gap 230 between the two membranes 220, 240. The small pores 222 at the feed chamber 212 just takes the role of forming high curvature menisci 306 to generate high vapor pressure. The larger pores at the permeate chamber 214 are receivers for water vapor transported from the feed chamber 212 and sustain any pressure drops at that interface. Resistance to transport of vapor is not determined by Knudsen diffusion, but is either limited by molecular diffusion or by ballistic transport, which results in a significantly higher flux. The gap 230 should be minimized for increasing the flux, but it generally should be large enough to prevent water on either side from merging. This would typically limit the gap 230 to a size similar to pore size. Spacers 232 between the membranes can provide mechanical support and can also serve to conduct heat from the permeate chamber 214 to the feed chamber 212. Presence of air inside the gap 230 can lower diffusivity. For this reason, it may be desirable to degas the feed water before desalination. For completely degassing inside the gap 230, the calculated flux in the suggested geometry can be approximately 20 times larger than commercial reverse osmosis membrane flux.

To the extent that variable and coefficients used in equations contained herein are not appropriately labeled through the disclosure, the variables and coefficients have the following meanings and/or values:

$P_A$: applied pressure to feed side (N/m$^2$)
$P_B$: pressure in permeate side (N/m$^2$)
$P_{pore}$: total pressure inside a membrane pore (N/m$^2$)
$P_{vap,A}$: vapor pressure on meniscus at feed side (N/m$^2$)
$P_{vap,A}^0$: vapor pressure of pure water with no curvature at feed side (N/m$^2$)
$P_{vap,A}^{0,\kappa}$: vapor pressure of pure water with finite curvature at feed side (N/m$^2$)
$P_{vap,B}$: vapor pressure on meniscus at permeate side (N/m$^2$)
$P_{vap,B}^0$: vapor pressure of pure water with no curvature at permeate side (N/m$^2$)
$P_{vap,B}^{0,\kappa}$: vapor pressure of pure water with finite curvature at permeate side (N/m$^2$)
$r_A$: radius of curvature of meniscus at feed side (m)
$r_B$: radius of curvature of meniscus at permeate side (m)
l: membrane thickness (m)
$x_w$: mole fraction of water in feed side $V_m$: molar volume of water (liquid) (=1.8×10$^{-5}$ m$^3$/mol)
$M_w$: molar mass of water (=1.8×10$^{-2}$ kg/mol)
γ: surface tension of water (N/m)
R: gas constant (=8.31 J/mol·K)
$T_s$: temperature of meniscus (K)

Further, materials related to the methods, systems, and devices disclosed herein include the following (some of which are disclosed above), each of which are hereby incorporated by reference in their entireties:

1. Miller, J. E. *Review of Water Resources and Desalination Technologies*; Sandia National Laboratories: 2003; pp 1-54.
2. Richard P. Cincotta, R. E., Daniele Anastasion *The Security Demographic: Population and Civil Conflict After the Cold War*; Population Action International: Washington D.C., 2003; pp 1-100.
3. Robert Engelman, R. P. C., Bonnie Dye, Tom Gardner-Outlaw, Jennifer Wisnewski *People in the Balance: Population and Natural Resources at the Turn of the Millennium*; Population Action International: Washington D.C., 2000; pp 1-36.
4. Mark A. Shannon, P. W. B., Menachem Elimelech, John G. Georgiadis, Benito J. Mariñas, Anne M. Mayes, Science and technology for water purification in the coming decades. *Nature* 2008, 452, 301-310.
5. Byeong-Heon Jeong, E. M. V. H., Yushan Yan, Arun Subramani, Xiaofei Huang, Gil Hurwitz, Asim K. Ghosh, Anna Jawor, Interfacial Polymerization of Thin Film Nanocomposites: A New Concept for Reverse Osmosis Membrane. *Journal of Membrane Science* 2007, 294, (1-2), 1-7.
6. G. W. Meindersma, C. M. G., A. B. de Haan, Desalination and Water Recycling by Air Gap Membrane Distillation. *Desalination* 2006, 187, (1-3), 291-301.
7. S. J. Gregg, K. S. W. S., *Adsorption, Surface Area and Porosity*. Academic Press: London and New York, 1967.
8. Carter, A. H., *Classical and Statistical Thermodynamics*. Prentice Hall: New Jersey, 2001.
9. U. Razdan, S. V. J., V. J. Shah, Novel Membrane Processes for Separation of Organics. *Current Science* 2003, 85, (6), 761-771.
10. R. L. RILEY, H. I. L., C. R. LYONS, Composite Membranes for Seawater Desalination by Reverse Osmosis. *Journal of Applied Polymer Science* 1971, 15, 1267-1276.
11. Williams, M. E. *A Brief Review of Reverse Osmosis Membrane Technology*; EET Corporation and Williams Engineering Services Company: Albany, 2003; pp 1-29.
12. Kevin W. Lawson, D. R. L., Membrane Distillation II. Direct Contact MD. *Journal of Membrane Science* 1996, 120, 123-133.
13. Surapit Srisurichan, R. J., A. G. Fane, Mass Transfer Mechanisms and Transport Resistances in Direct Contact Membrane Distillation Process. *Journal of Membrane Science* 2006, 277, 186-194.
14. Mohammad Soltanieh, W. N. G., Review of Reverse-Osmosis Membranes and Transport Models. *Chemical Engineering Communications* 1981, 12, (4-6), 279-363.
15. E. A. Mason, A. P. M., *Gas transport in porous media: the dusty-gas model*. Elsevier: New York, 1983.
16. Kevin W. Lawson, D. R. L., Membrane distillation. *Journal of Membrane Science* 1997, 123, 1-25.
17. Thomas K. Sherwood, R. L. P., Charles R. Wilke, *Mass transfer*. McGraw-Hill: 1975.

One skilled in the art will appreciate further features and advantages of the invention based on the above-described embodiments. By way of non-limiting example, the devices and methods could include a looped configuration in which liquid from the permeate side is recycled back to the feed side, which can allow for improved purification by filtering the liquid two or more times. By way of further non-limiting example, while embodiments described herein are typically described in conjunction with a batch process design, other designs can also be achieved. By way of non-limiting example, the embodiments described herein can also be used in a continuous flow design. In such an embodiment, a flow of feed water can be configured to enter a feed chamber and a flow of more concentrated salt water can be configured to flow out of the feed chamber, while pure water passes through the membrane to a permeate chamber. Accordingly, the invention is not to be limited by what has been particularly shown and described, except as indicated by the appended claims. All publications and references cited herein are expressly incorporated herein by reference in their entirety.

What is claimed is:

1. A method for filtering a liquid substance, comprising:
providing a filtration device having a feed chamber, a permeate chamber, and a first porous membrane that is at least partially hydrophobic disposed therebetween;
providing a second porous membrane that is at least partially hydrophobic and is disposed between the first porous membrane and the permeate chamber, further comprising:
providing a gap disposed between the first and second porous membranes to define a permeate space across which the vapor passes as it traverses from the feed chamber to the permeate chamber;
applying a pressure to liquid substance disposed in the feed chamber to cause the substance to pass as a vapor from the feed chamber to the permeate chamber, and
wherein the method is approximately isothermal.

2. The method of claim 1, further comprising degassing the gap.

3. A method for filtering a liquid substance, comprising:
providing a first porous membrane disposed between a feed side and a permeate side;
providing a second porous membrane disposed between the first porous membrane and the permeate side;
providing a gap between the feed side and the permeate side, wherein the first porous membrane is disposed on one side of the gap, adjacent to the feed side of the second porous membrane is disposed on another side of the gap, adjacent to the permeate side;
providing a liquid substance on the feed side;
forming a first liquid meniscus on a side of a pore of the first porous membrane that is adjacent to the gap;
forming a liquid meniscus on a side of a pore of the second porous membrane that is adjacent to the gap;
applying a pressure to the liquid substance disposed on the feed side, the pressure being sufficient to cause the substance to pass as a vapor from the feed chamber to the permeate chamber; and
transporting the substance as a vapor between the first and second menisci, such that the vapor traverses from the feed side to the permeate side;
wherein the method is approximately isothermal.

4. The method if claim 3, further comprising degassing the gap.

5. The method of claim 3, further comprising increasing a curvature of at least one of the first and second menisci.

6. A method for filtering a liquid substance, comprising:
providing a filtration device having a feed chamber, a permeate chamber, and a porous membrane that is at least partially hydrophobic disposed therebetween, wherein a thickness of the membrane (l) ranges from about 60 micrometers to about 10 nanometers and an average pore radius (a) is about 200 nanometers or less, such that a lower ratio of the thickness to the pore radius (l/a) increases a probability of vapor transport across the membrane; and
applying a pressure to the liquid substance disposed in the feed chamber to cause the substance to pass as a vapor from the feed chamber to the permeate chamber, wherein the pressure applied exceeds osmotic pressure and facilitates vapor transport across the membrane; and
wherein the method is approximately isothermal.

7. The method of claim 6, wherein the pressure applied exceeds osmotic pressure.

8. The method of claim 6, wherein the pressure applied to the liquid substance is approximately at least 30 atmospheres.

9. The method of claim 6, wherein the method is approximately isothermal having a temperature difference across the porous membrane in the range of about 0.005 degrees Celsius to about 0.02 degrees Celsius.

10. The method of claim 6, further comprising:
rinsing and drying the porous membrane to restore wetted pores to a non-wetted state.

11. A method for filtering a liquid substance, comprising:
providing a filtration device having a feed chamber, a permeate chamber, and a porous membrane that is at least partially hydrophobic disposed therebetween, wherein a thickness of the membrane (l) ranges from about 60 micrometers to about 10 nanometers and an average pore radius (a) is about 200 nanometers or less, such that a lower ratio of the thickness to the pore radius (l/a) increases vapor transport across the membrane; and
inducing a vapor pressure difference across the membrane to transport the substance as a vapor across the porous membrane to pass from the feed chamber to the permeate chamber,
wherein the method is approximately isothermal having a temperature difference across the porous membrane in the range of about 0.005 degrees Celsius to about 0.02 degrees Celsius.

12. A method for filtering a liquid substance, comprising:
providing a filtration device having a feed chamber, a permeate chamber, a first porous membrane that is at least partially hydrophobic disposed between the feed chamber and the permeate chamber, and a second porous membrane that is at least partially hydrophobic and is disposed between the first porous membrane and the permeate chamber;
providing a gap disposed between the first and second porous membranes to define a permeate space between the feed chamber and the permeate chamber; and
inducing a vapor pressure difference across the first and second membranes to transport the liquid substance as a vapor from the feed chamber through the first porous membrane, across the gap and through the second porous membrane to the permeate chamber, wherein a temperature difference between the feed chamber and the permeate chamber is in the range of about 0.005 degrees Celsius to about 0.02 degrees Celsius.

* * * * *